United States Patent
DiVerdi et al.

(10) Patent No.: US 10,957,063 B2
(45) Date of Patent: Mar. 23, 2021

(54) DYNAMICALLY MODIFYING VIRTUAL AND AUGMENTED REALITY CONTENT TO REDUCE DEPTH CONFLICT BETWEEN USER INTERFACE ELEMENTS AND VIDEO CONTENT

(71) Applicants: Adobe Inc., San Jose, CA (US); Portland State University, Portland, OR (US)

(72) Inventors: Stephen DiVerdi, Oakland, CA (US); Cuong Nguyen, San Francisco, CA (US); Aaron Hertzmann, San Francisco, CA (US); Feng Liu, Portland, OR (US)

(73) Assignee: ADOBE INC., San Jose, CA (US)

( * ) Notice: Subject to any disclaimer, the term of this patent is extended or adjusted under 35 U.S.C. 154(b) by 200 days.

(21) Appl. No.: 15/935,976

(22) Filed: Mar. 26, 2018

(65) Prior Publication Data
US 2019/0295280 A1 Sep. 26, 2019

(51) Int. Cl.
*G06T 7/593* (2017.01)
*G06T 7/73* (2017.01)
(Continued)

(52) U.S. Cl.
CPC .............. *G06T 7/593* (2017.01); *G06T 7/529* (2017.01); *G06T 7/73* (2017.01); *G06T 19/006* (2013.01);
(Continued)

(58) Field of Classification Search
None
See application file for complete search history.

(56) References Cited

U.S. PATENT DOCUMENTS 5,383,013 A * 1/1995 Cox ................. G06T 7/593
356/2
8,817,073 B2 * 8/2014 Wang ................. H04N 19/597
348/43
(Continued)

OTHER PUBLICATIONS

Piotr Didyk, Tobias Ritschel, Elmar Eisemann, Karol Myszkowski, Hans-Peter Seidel, Wojciech Matusik, A luminance-contrast-aware disparity model and applications, ACM Transactions on Graphics (TOG), v.31 n.6, Nov. 2012.
(Continued)

*Primary Examiner* — Matthew C Bella
*Assistant Examiner* — Brian D Shin
(74) *Attorney, Agent, or Firm* — Keller Jolley Preece

(57) ABSTRACT

The present disclosure relates to systems, methods, and non-transitory computer readable media for generating modified video content to reduce depth conflicts between user interface elements and video objects. For example, the disclosed systems can analyze an input video to identify feature points that designate objects within the input video and to determine the depths of the identified feature points. In addition, the disclosed systems can compare the depths of the feature points with a depth of a user interface element to determine whether there are any depth conflicts. In response to detecting a depth conflict, the disclosed systems can modify the depth of the user interface element to reduce or avoid the depth conflict. Furthermore, the disclosed systems can apply a blurring effect to an area around a user interface element to reduce the effect of depth conflicts.

20 Claims, 14 Drawing Sheets

(51) Int. Cl.
  *G06T 7/529* (2017.01)
  *G06T 19/00* (2011.01)
(52) U.S. Cl.
  CPC .............. *G06T 2207/10021* (2013.01); *G06T 2207/10028* (2013.01)

(56) References Cited

U.S. PATENT DOCUMENTS

| | | | | |
|---|---|---|---|---|
| 8,890,812 | B2* | 11/2014 | Billerbeck | G06F 3/017 345/156 |
| 2006/0132487 | A1* | 6/2006 | Sada | G06T 7/536 345/427 |
| 2007/0286520 | A1* | 12/2007 | Zhang | H04N 7/147 382/264 |
| 2011/0090149 | A1* | 4/2011 | Larsen | A63F 13/10 345/158 |
| 2015/0261387 | A1* | 9/2015 | Petersen | G06F 3/013 715/765 |
| 2016/0012567 | A1* | 1/2016 | Siddiqui | H04N 13/239 382/154 |

OTHER PUBLICATIONS

Robert Anderson, David Gallup, Jonathan T. Barron, Janne Kontkanen, Noah Snavely, Carlos Hernández, Sameer Agarwal, and Steven M. Seitz. 2016. Jump: virtual reality video. ACM Transactions on Graphics 35, 6 (Nov. 2016), 1-13. DOI: http://dx.doi.org/10.1145/2980179.2980257.

Stephen R Arnott and Judith M Shedden. 2000. Attention switching in depth using random-dot autostereograms: Attention gradient asymmetries. Attention, Perception, & Psychophysics 62, 7 (2000), 1459-1473.

Anastasia Bezerianos, Pierre Dragicevic, and Ravin Balakrishnan. 2006. Mnemonic Rendering: An Image-Based Approach for Exposing Hidden Changes in Dynamic Displays. In Proceedings of the 19th annual ACM symposium on User interface software and technology—UIST '06. ACM Press, New York, New York, USA, 159. DOI: http://dx.doi.org/10.1145/1166253.1166279.

Tobias Blum, Matthias Wieczorek, Andre Aichert, Radhika Tibrewal, and Nassir Navab. 2010. The effect of out-of-focus blur on visual discomfort when using stereo displays. In 2010 IEEE International Symposium on Mixed and Augmented Reality. IEEE, 13-17. DOI: http://dx.doi.org/10.1109/ISMAR.2010.5643544.

David K. Broberg. 2011. Infrastructures for Home Delivery, Interfacing, Captioning, and Viewing of 3-D Content. Proc. IEEE 99, 4 (Apr. 2011), 684-693. DOI: http://dx.doi.org/10.1109/JPROC.2010.2092390.

Jacqueline Chu, Chris Bryan, Min Shih, Leonardo Ferrer, and Kwan-Liu Ma. 2017. Navigable Videos for Presenting Scientific Data on Affordable Head-Mounted Displays. In Proceedings of the 8th ACM on Multimedia Systems Conference—MMSys'17. ACM Press, New York, New York, USA, 250-260. DOI: http://dx.doi.org/10.1145/3083187.3084015.

Adeola Fabola, Alan Miller, and Richard Fawcett. 2015. Exploring the past with Google Cardboard. In Digital Heritage, 2015, vol. 1. IEEE, 277-284.

Steven Feiner, Blair MacIntyre, Marcus Haupt, and Eliot Solomon. 1993. Windows on the world: 2D windows for 3D augmented reality. In Proceedings of the 6th annual ACM symposium on User interface software and technology. ACM, 145-155.

Davide Gadia, Marco Granato, Dario Maggiorini, Laura Anna Ripamonti, and Cinzia Vismara. 2017. Consumer-oriented Head Mounted Displays: Analysis and Evaluation of Stereoscopic Characteristics and User Preferences. Mobile Networks and Applications Feb. (Feb. 2017), 1-11. DOI: http://dx.doi.org/10.1007/s11036-017-0834-9.

David M Hoffman and Martin S Banks. 2010. Focus information is used to interpret binocular images. Journal of vision 10, 5 (2010), 13. DOI: http://dx.doi.org/10.1167/10.5.13.

Hong Hua. 2017. Enabling Focus Cues in Head-Mounted Displays. Proc. IEEE 105, 5 (May 2017), 805-824. DOI: http://dx.doi.org/10.1109/JPROC.2017.2648796.

Jingwei Huang, Zhili Chen, Duygu Ceylan, and Hailin Jin. 2017. 6-DOF VR videos with a single 360-camera. In 2017 IEEE Virtual Reality (VR). IEEE, 37-44. DOI: http://dx.doi.org/10.1109/VR.2017.7892229.

Michael Xuelin Huang, Tiffany CK Kwok, Grace Ngai, Stephen CF Chan, and Hong Va Leong. 2016. Building a personalized, auto-calibrating eye tracker from user interactions. In Proceedings of the 2016 CHI Conference on Human Factors in Computing Systems. ACM, 5169-5179.

Robert Kennedy, Norman Lane, Kevin Berbaum, and Michael Lilienthal. 1993. Simulator sickness questionnaire: An enhanced method for quantifying simulator sickness. (1993).

Johannes Kopf. 2016. 360 video stabilization. ACM Trans. Graphics (2016).

Gregory Kramida and Amitabh Varshney. 2015. Resolving the Vergence-Accommodation Conflict in Head Mounted Displays. IEEE Transactions on Visualization and Computer Graphics 22, 7 (2015), 1-16. DOI: http://dx.doi.org/10.1109/TVCG.2015.2473855.

Arun Kulshreshth and Joseph J. LaViola. 2016. Dynamic Stereoscopic 3D Parameter Adjustment for Enhanced Depth Discrimination. In Proceedings of the 2016 CHI Conference on Human Factors in Computing Systems—CHI '16. ACM Press, New York, New York, USA, 177-187. DOI: http://dx.doi.org/10.1145/2858036.2858078.

Jeremy Lacoche, Morgan Le Chenechal, Sebastien Chalme, Jerome Royan, Thierry Duval, Valerie Gouranton, Eric Maisel, and Bruno Arnaldi. 2015. Dealing with frame cancellation for stereoscopic displays in 3D user interfaces. In 2015 IEEE Symposium on 3D User Interfaces (3DUI). IEEE, 73-80. DOI: http://dx.doi.org/10.1109/3DUI.2015.7131729.

M. Lambooij, M.J. Murdoch, W.A. IJsselsteijn, and I. Heynderickx. 2013. The impact of video characteristics and subtitles on visual comfort of 3D TV. Displays 34, 1 (Jan. 2013), 8-16. DOI: http://dx.doi.org/10.1016/j.displa.2012.09.002.

Marc T. M. Lambooij, Wijnand A. IJsselsteijn, and Ingrid Heynderickx. 2007. Visual discomfort in stereoscopic displays: a review. 6490, May 2010 (2007), 64900I. DOI: http://dx.doi.org/10.1117/12.705527.

Robert S. Laramee and Colin Ware. 2002. Rivalry and interference with a head-mounted display. ACM Transactions on Computer-Human Interaction 9, 3 (Sep. 2002), 238-251. DOI: http://dx.doi.org/10.1145/568513.568516.

Andrew MacQuarrie and Anthony Steed. 2017. Cinematic virtual reality: Evaluating the effect of display type on the viewing experience for panoramic video. In Virtual Reality (VR), 2017 IEEE. IEEE, 45-54.

Kevin Matzen, Michael F. Cohen, Bryce Evans, Johannes Kopf, and Richard Szeliski. 2017. Low-cost 360 stereo photography and video capture. ACM Trans. Graphics (2017).

Ming Hou. 2003. A model of real-virtual object interactions in stereoscopic augmented reality environments. In Proceedings on Seventh International Conference on Information Visualization, 2003. IV 2003., vol. 2003-Janua. IEEE Comput. Soc, 512-517. DOI: http://dx.doi.org/10.1109/IV.2003.1218033.

Cuong Nguyen, Stephen DiVerdi, Aaron Hertzmann, and Feng Liu. 2017a. CollaVR: Collaborative In-Headset Review for VR Video. In Submitted to ACM symposium on User interface software and technology—UIST '17. ACM.

Cuong Nguyen, Stephen DiVerdi, Aaron Hertzmann, and Feng Liu. 2017b. Vremiere: In-Headset Virtual Reality Video Editing. In Proceedings of the 2017 CHI Conference on Human Factors in Computing Systems—CHI '17. ACM Press, New York, New York, USA, 5428-5438. DOI: http://dx.doi.org/10.1145/3025453.3025675.

Thomas Oskam, Alexander Hornung, Huw Bowles, Kenny Mitchell, and Markus Gross. 2011. OSCAM—optimized stereoscopic camera control for interactive 3D. In Proceedings of the 2011 SIGGRAPH Asia Conference on—SA '11. ACM Press, New York, New York, USA, 1. DOI:http://dx.doi.org/10.1145/2024156.2024223.

(56) References Cited

OTHER PUBLICATIONS

Javier Sánchez Pérez, Enric Meinhardt-Llopis, and Gabriele Facciolo. 2013. TV-L1 optical flow estimation. Image Processing on Line 2013 (2013), 137-150.

Stephan Reichelt, Ralf Häussler, Gerald Fütterer, and Norbert Leister. 2010. Depth cues in human visual perception and their realization in 3D displays. In Proc. SPIE, vol. 7690. 76900B.

Leila Schemali and Elmar Eisemann. 2014. Design and evaluation of mouse cursors in a stereoscopic desktop environment. In 2014 IEEE Symposium on 3D User Interfaces (3DUI). IEEE, 67-70. DOI: http://dx.doi.org/10.1109/3DUI.2014.6798844.

Jonas Schild, Liane Bölicke, Joseph J. LaViola Jr., and Maic Masuch. 2013. Creating and analyzing stereoscopic 3D graphical user interfaces in digital games. In Proceedings of the SIGCHI Conference on Human Factors in Computing Systems—CHI '13. ACM Press, New York, New York, USA, 169. DOI: http://dx.doi.org/10.1145/2470654.2470678.

Jonas Schild, Joseph J. LaViola, and Maic Masuch. 2014. Altering gameplay behavior using stereoscopic 3D vision-based video game design. In Proceedings of the 32nd annual ACM conference on Human factors in computing systems—CHI '14. ACM Press, New York, New York, USA, 207-216. DOI: http://dx.doi.org/10.1145/2556288.2557283.

Aljoscha Smolic, Peter Kauff, Sebastian Knorr, Alexander Hornung, Matthias Kunter, M MulLller, and Manuel Lang. 2011. Three-Dimensional Video Postproduction and Processing. Proc. IEEE 99, 4 (Apr. 2011), 607-625. DOI: http://dx.doi.org/10.1109/JPROC.2010.2098350.

Filippo Speranza, Wa J Tam, Ron Renaud, and Namho Hur. 2006. Effect of disparity and motion on visual comfort of stereoscopic images. In Proceedings of SPIE: Stereoscopic Displays and Virtual Reality Systems XIII, Andrew J. Woods, Neil A. Dodgson, John O. Merritt, Mark T. Bolas, and Ian E. McDowall (Eds.), vol. 6055. 60550B. DOI:http://dx.doi.org/10.1117/12.640865.

Wa James Tam, Filippo Speranza, Carlos Vázquez, Ron Renaud, and Namho Hur. 2012. Visual comfort: stereoscopic objects moving in the horizontal and mid-sagittal planes. In Proc. SPIE, Andrew J. Woods, Nicolas S. Holliman, and Gregg E. Favalora (Eds.), vol. 8288. 828813. DOI:http://dx.doi.org/10.1117/12.909121.

Junle Wang, Patrick Le Callet, Sylvain Tourancheau, Vincent Ricordel, and Matthieu Perreira Da Silva. 2012. Study of depth bias of observers in free viewing of still stereoscopic synthetic stimuli. Journal of Eye Movement Research 5, 5 (2012).

Colin Ware. 1995. Dynamic stereo displays. Proceedings of the SIGCHI conference on Human factors in computing systems—CHI '95 (1995), 310-316. DOI: http://dx.doi.org/10.1145/223904.223944.

Yong Jung, Hosik Sohn, Seong-il Lee, and Yong Ro. 2014. Visual comfort improvement in stereoscopic 3D displays using perceptually plausible assessment metric of visual comfort. IEEE Transactions on Consumer Electronics 60, 1 (Feb. 2014), 1-9. DOI: http://dx.doi.org/10.1109/TCE.2014.6780918.

* cited by examiner

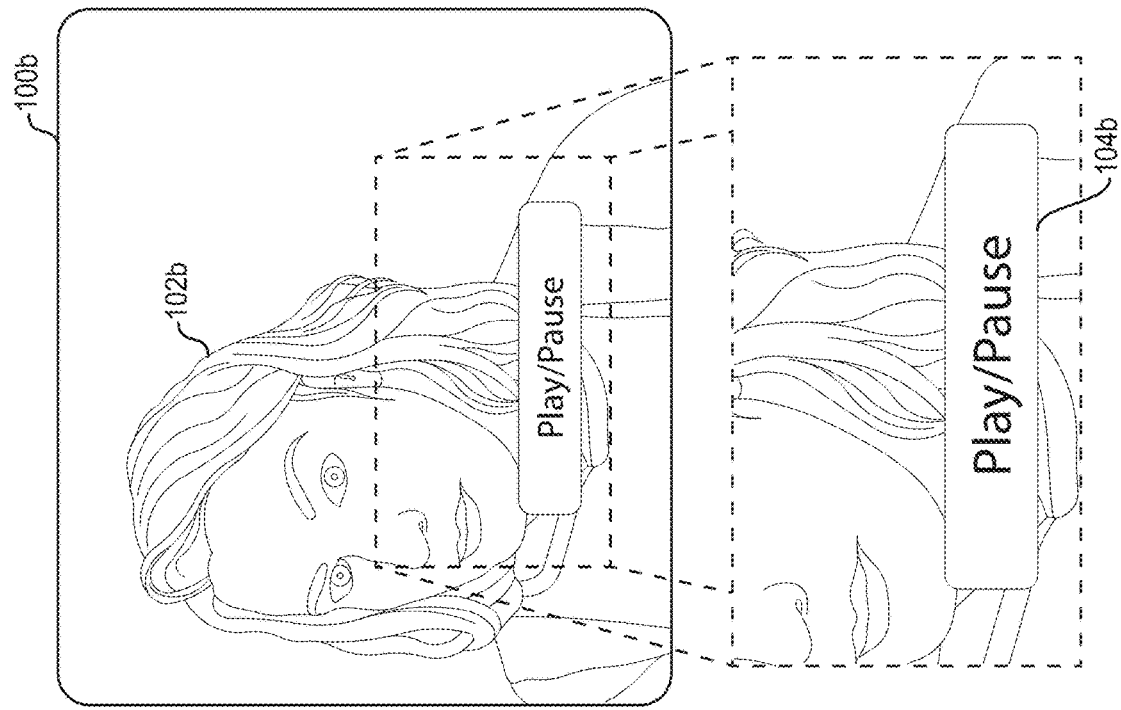
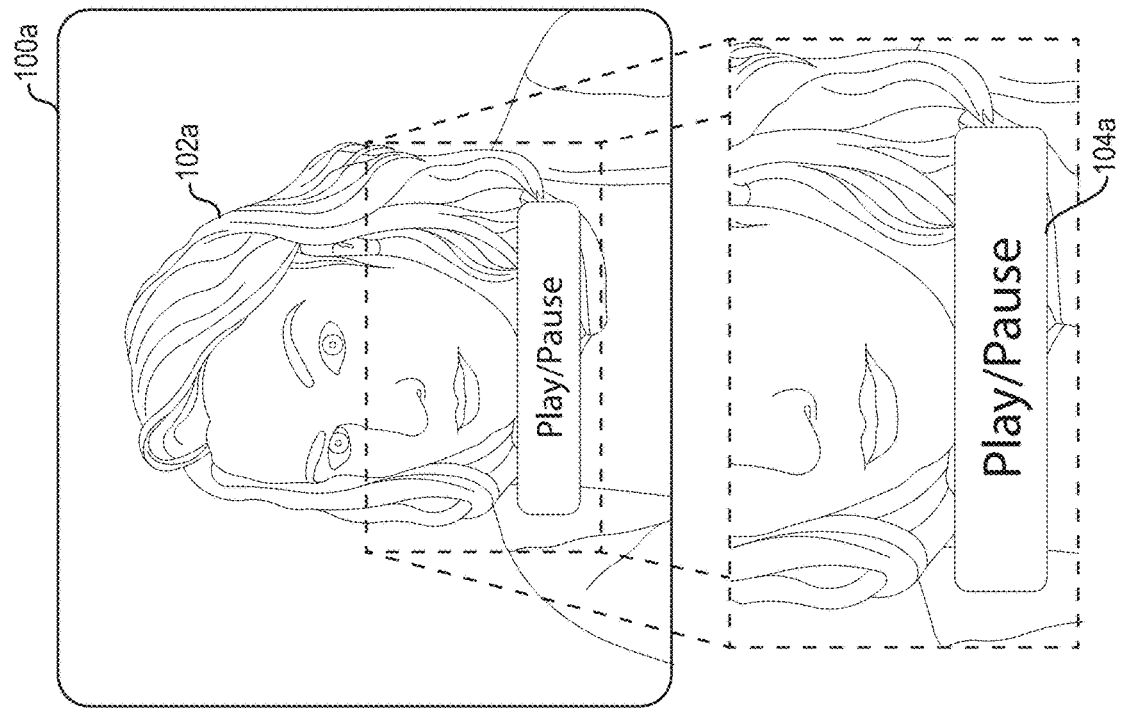
Fig. 1

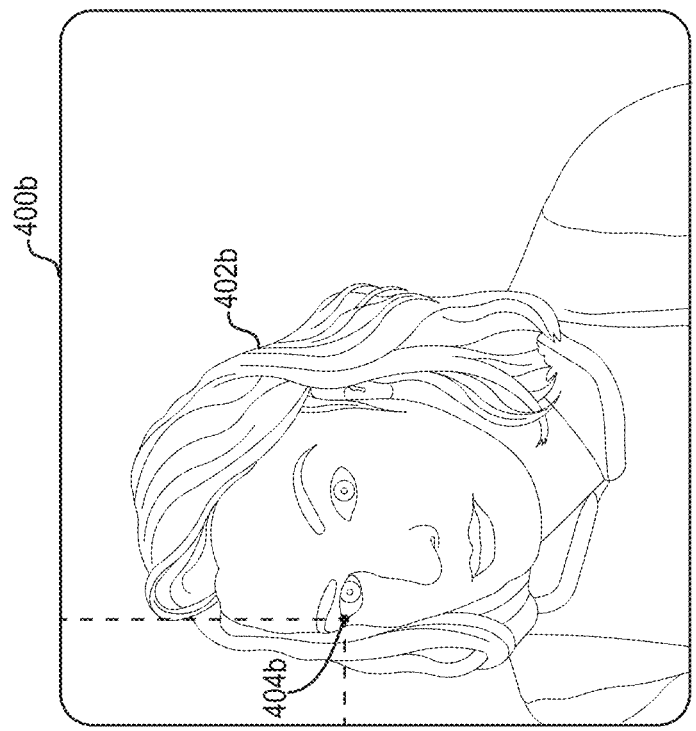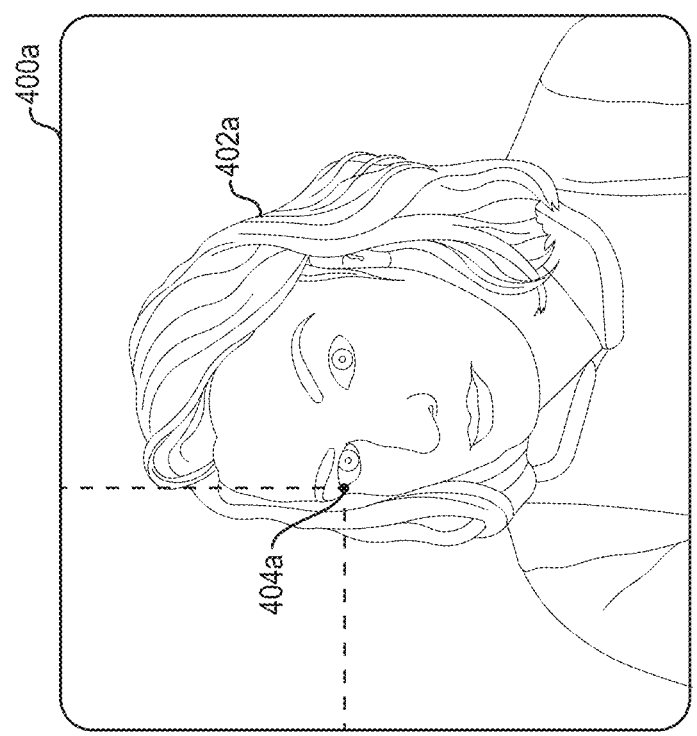
Fig. 4

DYNAMICALLY MODIFYING VIRTUAL AND AUGMENTED REALITY CONTENT TO REDUCE DEPTH CONFLICT BETWEEN USER INTERFACE ELEMENTS AND VIDEO CONTENT

This invention was made with government support under contract no. 1321119 awarded by the National Science Foundation. The government has certain rights in the invention.

BACKGROUND

The increased availability of virtual reality head-mounted displays is increasing interest in capturing and sharing 360-degree video, particularly stereoscopic 360-degree video. Stereoscopic 360-degree video, which provides a much greater sense of immersion than monoscopic video, is becoming more and more popular and accessible due to recent advances in camera technology. Content producers are now creating stereoscopic 360-degree videos for entertainment, news and documentaries, real estate, data visualization, virtual tours, free-viewpoint video, and more. To support the increase in stereoscopic 360-degree videos, video rendering systems are now including new editing tools.

For example, some video rendering systems now are able to analyze stereoscopic 360-degree video content and place user interface elements within the 360-degree video content. In particular, conventional video rendering systems often render user interface widgets like video navigation, subtitles, annotations, and tool palettes on top of the 360-degree video. Despite these advances however, conventional video rendering systems continue to suffer from a number of disadvantages. For instance, while conventional video rendering systems can generate user interface elements to include within 360-degree video content, these systems often create conflicts between depth cues. Indeed, positioning user interface elements within video content can create confusing visual cues as well as visual discomfort for a user. As an example, some conventional video rendering systems can position a user interface element over a video element that a user perceives to be closer than the user interface element, which results in a conflict between the stereopsis depth cue and the occlusion depth cue. In other words, objects in the video are blocked by a user interface element that is behind the video objects. To an observer, a presentation that results in depth conflicts can be confusing and uncomfortable.

The foregoing problems are often exacerbated in dynamic virtual reality environments. In particular, unlike video game development and other environments in which entire three-dimensional scenes are known, dynamic virtual reality environments are unpredictable as the arrangement between the user interface elements and the objects in the video are not known in advance. Due to the unpredictable nature of dynamic virtual reality environments, most commercial video rendering systems do not handle depth conflicts directly. For example, some conventional video rendering systems do not allow for display of user interface element during playback of stereoscopic 360-degree video content. Other conventional video rendering systems render the video image as monoscopic when providing user interface elements on the video. Still other conventional video rendering systems render user interface elements uncomfortably close to the viewer in an attempt to reduce conflicts. Unfortunately, prolonged exposure to close objects in virtual reality is uncomfortable and still does not solve the problem completely.

Thus, there are several disadvantages with regard to conventional video rendering systems.

SUMMARY

One or more embodiments described herein provide benefits and solve one or more of the foregoing or other problems in the art by providing systems, methods, and non-transitory computer readable media that accurately and flexibly position a user interface element within 360-degree video content to reduce depth conflicts. For instance, in one or more embodiments, the disclosed systems compare depths of objects within video content with the depth of a user interface element and dynamically reposition the user interface element within the video content to reduce or resolve conflicts of visual depth cues for a user. To illustrate, in one or more embodiments, the disclosed systems dynamically analyze an input 360-degree video to identify feature points within the input 360-degree video. Based on analyzing the input video, the disclosed systems dynamically determine depths of the feature points and further compare the depths of the feature points with a depth of a user interface element. In addition, the disclosed systems generate an output video that dynamically modifies a depth of a user interface element to reduce depth conflicts.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 1 illustrates user interfaces of a stereoscopic video showing a depth conflict between a user interface element and a video object in accordance with one or more embodiments;

FIG. 4 illustrates a screen disparity of a stereoscopic video in accordance with one or more embodiments;

DETAILED DESCRIPTION

Figure 2:
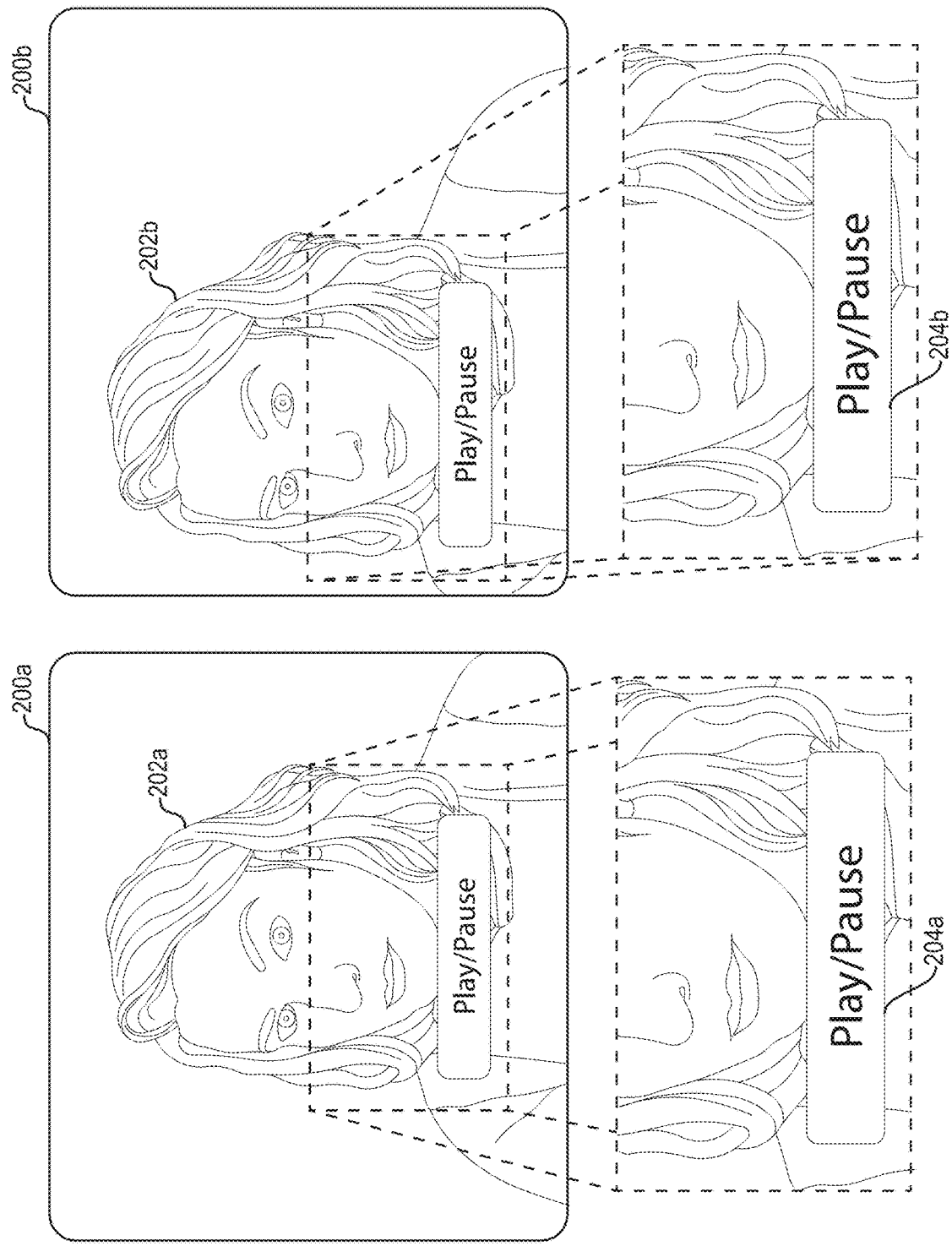
FIG. 2 illustrates the user interfaces of FIG. 1 albeit with a modified a user interface element to avoid the depth conflict in accordance with one or more embodiments.

One or more embodiments described herein include a depth conflict reduction system that accurately and flexibly modifies a user interface element within video content to reduce depth conflicts. For instance, in one or more embodiments, the depth conflict reduction system analyzes a stereoscopic video to identify feature points within the stereoscopic video. Based on analyzing the stereoscopic video to identify the feature points, the depth conflict reduction system determines depths of the feature points within the stereoscopic video. By determining the depths of the feature points within the stereoscopic video, the depth conflict reduction system can effectively determine depths of objects within the video content of the stereoscopic video. In addition, the depth conflict reduction system can compare the depths of the feature points with a depth of a user interface element within the stereoscopic video. Based on the comparison, the depth conflict reduction system can generate an output stereoscopic video that includes a modified user interface element that avoids a depth conflict between the user interface element and objects in the stereoscopic video. Indeed, the depth conflict reduction system can dynamically modify a position of the user interface element to avoid depth conflicts with video content.

As just mentioned, in one or more embodiments, the depth conflict reduction system analyzes a stereoscopic video to identify feature points within the stereoscopic video. To analyze the stereoscopic video, the depth conflict reduction system estimates dense correspondences between a left view (e.g., a view associated with a left camera) and a right view (e.g., a view associated with a right camera) of each frame of the video. Indeed, as will be described in further detail below, the depth conflict reduction system can analyze 360-degree videos for virtual reality or augmented reality content by implementing an optical flow method to estimate dense correspondences between left and right views of each frame to thereby determine depths associated with pixels of a given frame.

The depth conflict reduction system identifies feature points by, for example, utilizing an edge detection and/or facial analysis technique. To illustrate, the depth conflict reduction system analyzes pixel values within the input video to identify edges, facial features, or other significant points within a given frame. Based on identifying feature points within the video, the depth conflict reduction system determines depths associated with the feature points utilizing the above-mentioned optical flow method. For example, to determine depths of a feature point in some embodiments, the depth conflict reduction system determines a screen disparity between a left view of the feature point and a right view of the feature point. The depth conflict reduction system can generate a disparity map for the video that defines depths of objects within the input video by determining screen disparities for feature points across the frames of the video. Additional detail regarding determining depths of feature points to generate a disparity map is provided below with reference to the figures.

The depth conflict reduction system can utilize the disparity map to detect depth conflicts with user interface elements. As just mentioned, the depth conflict reduction system detects depth conflicts between objects within the video and user interface elements. To illustrate, the depth conflict reduction system can determine a depth associated with a user interface element and can compare the depth of the user interface element with the depths of the identified feature points to determine if there are depth conflicts between objects in the video and the user interface element.

To compare the depth of the user interface element with the depths of the objects in the video, the depth conflict reduction system analyzes a region of the disparity map (e.g., a set of feature points within the disparity map) around where the user interface element is positioned. To elaborate, the depth conflict reduction system identifies a region of the input video where the user interface element is positioned (or will be positioned), and the depth conflict reduction system identifies a set of feature points within the identified region. For example, in some embodiments, the depth conflict reduction system defines the region of the input video as any portion of the input video that is within a threshold angle (e.g., 30 degrees) from a center point of the user interface element. Accordingly, the depth conflict reduction system selects a set of feature points around the user interface element to consider, rather than analyzing each feature point across the entirety of each frame of the video for depth conflicts. In addition, the depth conflict reduction system can aggregate the depths of the feature points within the region around the user interface element (e.g., within the threshold angle) by, for example, averaging the screen disparities of each feature point within the region. Accordingly, the depth conflict reduction system can compare the average depth of the region around the user interface element with the depth of the user interface element.

More specifically, the depth conflict reduction system can determine whether the depth of the user interface element is within a depth threshold of the average depth of the region around the user interface element (e.g., the region within the threshold angle). For example, the depth conflict reduction system can identify a depth conflict if the difference between the depth of the user interface element and the depth of the region within the threshold angle exceeds a depth threshold (e.g., 5 pixels).

To resolve or reduce identified depth conflicts, the depth conflict reduction system can modify the user interface element to position the user interface element so that a user's depth cues while viewing the user interface element do not conflict with depth cues associated with objects in the input video. To illustrate, in cases where the depth conflict reduction system determines that a depth conflict exists between the user interface element and the input video, the depth conflict reduction system can move or reposition the user interface element within the input video to resolve or reduce the depth conflict. For example, the depth conflict reduction system can change the depth of the user interface element to move the element closer or farther away within the user's view to satisfy the depth threshold between the user interface element and the region of the input video within the threshold angle. Additional detail regarding modifying the user interface element in response to identifying a depth conflict is provided below in relation to the figures.

On the other hand, in cases where the depth conflict reduction system determines that the there is no depth conflict or otherwise does not affirmatively determine that there is a depth conflict, the depth conflict reduction system can place or position the user interface element at a default depth within the input video.

In other embodiments, the depth conflict reduction system can reduce or resolve depth conflicts by identifying a position of the user interface element within an input video and blurring a region around the user interface element. To elaborate, the depth conflict reduction system can generate a blurred texture canvas having dimensions larger than the user interface element. The depth conflict reduction system can place the canvas at a position behind the user interface element (e.g., by overlaying the user interface element over the canvas). Thus, the depth conflict reduction system can blur an area of the input video around the user interface to reduce depth conflicts. Additional detail regarding applying a blurring effect to reduce depth conflict is provided below with reference to the figures.

The depth conflict reduction system provides several advantages over conventional video rendering systems. For example, the depth conflict reduction system improves accuracy and effectiveness over conventional video rendering systems. For example, some conventional video rendering systems attempt to resolve depth conflicts by removing user interface elements during video playback entirely, while other conventional systems attempt to resolve depth conflicts by placing user interface elements at a fixed depth that is unlikely to interfere with objects within the video content—a depth that is often too close for comfort within the view of a user. The depth conflict reduction system, on the other hand, dynamically repositions the user interface element within the input video to reduce depth conflict while still enabling the user to interact with the user interface element. Thus, the depth conflict reduction system provides increased flexibility by dynamically modifying the depth of a user interface element based on depths of objects within an input video.

Furthermore, the depth conflict reduction system is faster and more efficient than conventional video rendering systems. To illustrate, the depth conflict reduction system can consume less memory and perform depth computations faster than conventional video rendering systems. For example, because the depth conflict reduction system dynamically determines depth information it does not need to store potentially large amounts of depth information. Thus, the depth conflict reduction system requires less computer memory than conventional systems that store depth map information. In addition, because the depth conflict reduction system dynamically estimates depth information using a screen disparity technique, the depth conflict reduction system does not have to decode an extra video streams (e.g., a depth channel). Thus, the depth conflict reduction system can modify a depth of the user interface element more quickly than conventional systems that require more computationally-intensive techniques.

Furthermore, as explained in greater detail below, the depth conflict reduction system can operate at speeds that allow for real time modification of user interface elements. In other words, the depth conflict reduction system can operate at speeds that allow the depth conflict reduction system to avoid conflicts despite not having depth data or position date of video objects in advance. More specifically, the depth conflict reduction system can use an efficient depth detection technique that allows for fast processing so as to reduce lag during live processing.

As illustrated by the foregoing discussion, the present disclosure utilizes a variety of terms to describe features and benefits of the depth conflict reduction system. Additional detail is provided regarding the meaning of these terms as used in this disclosure. For example, as used herein, the term "input video" refers to stereoscopic video content or data. In particular, an input video can refer to a number of frames of video content and may comprise spherical 360-degree video content such as virtual reality video content or augmented reality video content. Indeed, an input video can refer to computer-generated video content or can refer to video content captured by a recording device (e.g., a 360-degree camera). In some embodiments, an input video can refer to stereoscopic video for display on a device such as a smartphone or a television. For instance, an input video can refer to red-blue video or three-dimensional shutter-glass video. In addition, an input video can include objects such as faces, trees, cars, tables, animals, or any other object captured within a video.

As also used herein, the term "output video" refers to an input video that the depth conflict reduction system modifies to avoid depth conflicts. For example, the depth conflict reduction system can generate an output video by generating a user interface element (or modifying an existing user interface element) and placing it within an input video. In addition, the depth conflict reduction system can generate the output video in real time for presentation to a user by way of a user client device. In other embodiments, the depth conflict reduction system generates the output video before presenting the output video to a user—i.e., the depth conflict reduction system analyzes the input video in its entirety to generate the complete output video with the user interface element before providing the output video to the user.

As used herein, the term "user client device" refers to a computing device associated with a user. For example, a user client device can refer to a mobile device such as a smartphone or a non-mobile device such as a desktop computer or a television. In addition, a user client device can refer to a virtual reality device such as GOOGLE DAYDREAM, OCULUS RIFT, or HTC VIVE or an augmented reality device such as MICROSOFT HOLOLENS or MAGIC LEAP LIGHTWEAR. A user client device can alternatively refer to a combination of devices such as a desktop computer and a virtual reality device. Indeed, the depth conflict reduction system can present an output video to a user that includes video content as well as a user interface element as an overlay on the video content by way of a user client device.

As mentioned, the depth conflict reduction system analyzes the input video to generate an output video that includes a user interface element that is depth conflict free. As used herein, the term "user interface element" refers to a computer-generated object for placement within a video or video frame. A user interface element can refer to an interactive or non-interactive digital overlay for presentation in conjunction with video content. For example, a user interface element can refer to a button, menu, subtitles, toolbar, or some other graphical element that the depth conflict reduction system can render for presentation together with video content.

As also mentioned, the depth conflict reduction system analyzes an input video to identify feature points within the input video. As used herein, the term "feature point" refers to an identifiable point within video content. More particularly, a feature point can refer to an edge, point, or other distinguishing feature of an object within video content. To illustrate, the depth conflict reduction system can identify feature points using edge detection techniques or facial analysis methods. Thus, a feature point can refer to an intersection of two lines or a point of abrupt change in pixel values (e.g., color values such as RGB or HSV values) that corresponds to a particular object or feature within the video content. For instance, a feature point can correspond to an edge of a table, an eye, a part of a wrinkle in a shirt, a point on a chair, a point along a person's hairline, a point along a person's chin or nose, or some other identifiable feature within an input video. In addition, the depth conflict reduction system can represent a given feature point as a set of spherical coordinates to more easily compare depths of various feature points and user interface elements.

Based on analyzing the input video to identify feature points, the depth conflict reduction system can further determine depths of the identified feature points. As used herein, the term "depth" refers to a perceived distance from a user's viewing position. For example, a user can perceive video content by way of a user client device that presents video content where some objects appear smaller and farther away in the frame than others that appear closer. More specifically, depth can refer to screen disparity that creates the sense of depth in the view of a user. As used herein, the term "screen disparity" refers to a difference between a left view of a stereoscopic image (e.g., a video frame) and a right view of the same stereoscopic image. Indeed, the depth conflict reduction system can present stereoscopic video content to a user where the left view (e.g., the view of the user as seen through the user's left eye or as associated with a left camera) of the video content has a slightly different perspective than the right view (e.g., the view of the user as seen through the user's right eye or as associated with a right camera) of the video content. This difference in perspective can be referred to as a screen disparity, which results in the user perceiving depth within the video content. In addition, screen disparity can be represented by a distance, such as a number of pixels, inches, centimeters, etc., between the position of a feature point within a left view and a position of the same feature point within a right view.

As mentioned, the depth conflict reduction system can modify a user interface element by repositioning the user interface element to satisfy a depth threshold in relation to a region around the user interface element. As used herein, the term "depth threshold" refers to a range of depths that, when exceeded, delineates a depth conflict. In particular, a depth threshold can refer to a difference in screen disparities where, when the screen disparities are within (or up to) the depth threshold. As such, the depth conflict reduction system can determine that there is no depth conflict when screen disparities exceed the depth threshold.

As mentioned, the depth conflict reduction system identifies depth conflicts between user interface elements and modifies user interface elements to reduce or resolve depth conflicts. As used herein, the term "depth conflict" refers to a conflict or incongruity between depth cues of a user. Generally, a user can perceive depth as a result of various different depth cues relating to a field of vision. For example, a user can observe depth due to depth cues such as vergence, accommodation, occlusion, texture, motion, and stereopsis, among others. A depth conflict can result when two or more of these depth cues conflict or are incongruent with each other. Some examples of depth conflicts are occlusion/stereopsis conflicts, near/far conflicts, and pictorial conflicts, each of which are described below.

An occlusion/stereopsis conflict is a result of a user perceiving a first object to be closer than a second object by stereopsis, but, by occlusion, perceiving the second object in front of the first object (i.e., the first object is occluded by the second object). Occlusion is one of the strongest depth cues, as such viewing video objects that are closer in depth but behind the UI can cause discomfort and some forms of double vision, e.g., the viewer sees two images of either the UI or the video.

A near/far conflict occurs when a user interface element and the video are perceived at very different depths. In such cases, the viewer's eyes typically have to re-verge when transitioning from one element to the other. Alternating eye focus can be cumbersome and may cause eyestrain.

A pictorial conflict occurs when textures of video content around or behind a user interface element are seen differently between a left view and a right view, creating a binocular rivalry between the user's eyes. A binocular rivalry makes it difficult for the user to focus on the user interface element properly.

As also mentioned, the depth conflict reduction system can compare the depth of the user interface element with the depth of a region of the input video that is within a threshold angle of the user interface element. As used herein, the term "threshold angle" refers to an angle that defines a particular region within an input video. In particular, a threshold angle can refer to a number of degrees or radians (e.g., 30 degrees, 40 degrees, etc.) between two vectors that originate at a user's position and project outward into the user's view of the input video. For example, a threshold angle can include an angle between a vector that intersects a center point of a user interface element and another vector that, when rotated, intersects all points a number of degrees (e.g., 30 degrees) from the center of the user interface element. Thus, a threshold angle can define a particular region around (the center of) a user interface element within an input video.

In addition to comparing depths of feature points and user interface elements, the depth conflict reduction system also modifies user interface elements. In particular, the depth conflict reduction system can reposition a user interface element within video content to reduce depth conflicts between objects or feature points within the video content and the user interface element. To position a user interface element, the depth conflict reduction system can adjust a frustum associated with a left view and a frustum associated with a right view. As used herein, the term "frustum" refers to a pyramid or cone of vision associated with an eye or camera. For example, a frustum can refer to pyramid or cone of vision associated with a left view or right view of video content. The depth conflict reduction system can independently adjust a frustum of a left view or a frustum associated with a right view to change an angle or depth of the user's field of vision with respect to the corresponding left or right view.

Indeed, the depth conflict reduction system can adjust a depth of a user interface element by adjusting a frustum at a default rate (e.g., a predefined rate or user-defined rate) or at a rate faster than the default rate. For example, to determine whether to adjust the depth of the user interface element at the default rate or at a faster rate, the depth conflict reduction system can first determine whether adjusting the depth of the user interface element would cause visual discomfort for a user. To illustrate, the depth conflict reduction system can determine whether the user interface element is moving faster than a speed threshold relative to the video content. As used herein, the term "speed threshold" refers to a speed of movement of a user interface element in relation to video content. For example, a user interface element can move relative to video content as a result of a user turning or otherwise moving a user client device to change the user's view of video content, or else by interacting with the user interface element to manually relocate it. In cases where the user interface element moves slower than (or up to) a speed threshold, the depth conflict reduction system can adjust the depth of the user interface element at a default rate to appear smooth and comfortable to a user. In cases where the user interface element is moving faster than the speed threshold, on the other hand, the depth conflict reduction system can adjust the depth of the user interface element at a faster rate to take advantage of the user's change blindness—a phenomenon that prevents users from noticing changes to the user interface element because of the speed of the movement within the video content.

More detail regarding the depth conflict reduction system will now be provided with reference to the figures. For example, FIG. 1 illustrates a depth conflict between a user interface element and an object within an output video in accordance with one or more embodiments. Indeed, FIG. 1 illustrates a left view 100a and a right view 100b of an output video. FIG. 2, on the other hand, illustrates a left view 200a and a right view 200b of an output video as generated by the depth conflict reduction system in accordance with one or more embodiments. An overview of the functionality of the depth conflict reduction system is described in relation to FIGS. 1-2. Thereafter, a more detailed description of the components and processes of the depth conflict reduction system is provided in relation to the subsequent figures.

As mentioned above, conventional video rendering systems often generate user interface elements that experience depth conflicts with video content. Indeed, as illustrated in FIG. 1, the user interface element (e.g., the "Play/Pause" element) is in conflict with the face of the individual depicted within the video content. To elaborate, the user interface element is overlaid on the video object (i.e., occludes the depicted individual), but the user interface element is also stereoscopically set at a depth farther away than the video object. While FIG. 1 illustrates one example depth conflict, additional or alternative depth conflicts are also possible between different depth cues, as described above.

As illustrated, the user observes a left view 100a of video content and a right view 100b of video content simultaneously—through the user's left eye and right eye, respectively. Indeed, the left video object 102a is in a slightly different position within the video content than the right video object 102b, thereby giving a user a sense of depth when viewing the video content. The slight difference in position (e.g., the screen disparity) between objects in the left view 100a and the right view 100b is what creates depth in a user's perception.

To illustrate from FIG. 1, the left user interface element 104a (i.e., the user interface element as seen in the left view 100a of the video content) is positioned centrally under the chin of the left video object 102a while the right user interface element 104b is positioned to the right of the chin of the right video object 102b. Such differences in position between the left user interface element 104a and the right user interface element 104b relative to the individual are due to the fact that the individual is positioned in different spots in the left view 100a and the right view 100b. Because the differences in position of the user interface element between the left view 100a and the right view 100b are lesser than the differences in position of the chin of the individual between the left view 100a and the right view 100b, a stereopsis cue indicates to a user that the user interface element 104a is behind the individual. At the same time, because the interface element 104a occludes the individual, an occlusion cue indicates to a user that the user interface element 104a is in front of the individual.

To resolve or reduce the depth conflict that a user might otherwise experience in a scenario illustrated by FIG. 1, the depth conflict reduction system generates an output video that includes a user interface element that is not in conflict with video content. Indeed, as described above, the depth conflict reduction system can modify user interface elements to avoid depth conflicts between user interface elements and objects within an input video. As shown in FIG. 2, the depth conflict reduction system generates an output video including a left view 200a and a right view 200b. Similar to the left view 100a and right view 100b of FIG. 1, the left view 200a and right view 200b of FIG. 2 present the left video object 202a (i.e., the left view of the individual depicted within the video content) and the right video object 202b (i.e., the right view of the individual depicted within the video content).

However, unlike FIG. 1, the depth conflict reduction system generates an output video to include a user interface element that is not in conflict with the any objects in the video content. To illustrate, the depth conflict reduction system provides a left user interface element 204a at a greater offset relative to the right user interface element 204b to cause the user interface element 204b to appear in front of the user. Indeed, as shown in FIG. 2, because the differences in position of the user interface element between the left view 200a and the right view 200b are greater than the differences in position of the chin of the individual between the left view 200a and the right view 200b, a stereopsis cue indicates to a user that the user interface element 104a is in front of the individual. At the same time, because the interface element 204a occludes the individual, an occlusion cue indicates to a user that the user interface element 204a is in front of the individual. Accordingly, the user simultaneously views the left view 200a and the right view 200b of the output video without experiencing confusion or discomfort.

To provide a user interface element without creating depth conflicts with video content, as shown in FIG. 2, the depth conflict reduction system analyzes the input video to determine depths of objects within the video content. As described in greater detail below, the depth conflict reduction system determines depths of objects within the input video by determining screen disparities between the left view 200a and the right view 200b. Indeed, the depth conflict reduction system can determine the depths of various portions of the video object by, for example, determining a screen disparity between the nose of the left video object 202a and the nose of the right video object 202b. Based on these screen disparities, the depth conflict reduction system can generate a user interface element that is within a depth threshold of, for example, the depth of a particular object (e.g., the nose) within the input video.

As illustrated in FIG. 2, the depth conflict reduction system can generate and provide a user interface element that is view-fixed. To elaborate, the depth conflict reduction system can generate a user interface element that moves with the view (e.g., the display of a user client device) of the user as the view moves relative to the video content (e.g., relative to the real-world surroundings of the user in the case of augmented reality). For instance, the depth conflict reduction system can generate view-fixed user interface elements such as advertisement banners, a compass, subtitles, etc.

In other embodiments, however, the depth conflict reduction system generates and provides a user interface that is world-fixed. For example, the depth conflict reduction system can generate tool palettes, annotations, gaze triggers, or other user interface elements that are fixed to a particular place within the video content. Thus, in these embodiments, the user interface element remains in place as if affixed to content depicted by the video, even as the user moves a view of the user client device relative to the video content.

While FIG. 2 illustrates an output video with a single user interface element and a single video object, in some embodiments, the depth conflict reduction system analyzes an input video with multiple video objects and generates more than one user interface element. Indeed, the depth conflict reduction system can analyze an input video that includes multiple individuals or other objects and can position user interface elements at any location within the user's view, relative to the depths of the identified objects within the input video to avoid any depth conflicts.

In addition, the depth conflict reduction system can analyze various types of input video to generate an output video that includes a user interface element. For example, the depth conflict reduction system can analyze an input video captured by a content capturing device such as a digital camera. In these embodiments, the depth conflict reduction system can overlay a user interface element in an augmented reality environment that includes video of real-world objects as well as computer-generated user interface elements. In addition, the depth conflict reduction system can analyze real-world video captured in real time—i.e., the depth conflict reduction system can generate an output video including a user interface element to provide to a user client device as the same user client device simultaneously captures a live video feed of the user's surroundings.

In other embodiments, the depth conflict reduction system can analyze input video in the form of computer-generated video content such as video game content or some other computer-generated video content. In these embodiments, the depth conflict reduction system can generate a user interface element to overlay on the video content in a virtual reality environment where each element of content (e.g., video content and user interface elements) is computer-generated.

As mentioned above, to generate the output video illustrated in FIG. 2, the depth conflict reduction system analyzes an input video to determine the depths of objects within the input video, and the depth conflict reduction system further positions the user interface element within the input video based on the depths of identified objects. Additional detail regarding the analysis of the input video and the positioning of the user interface element within the video content is provided hereafter.

Figure 3:
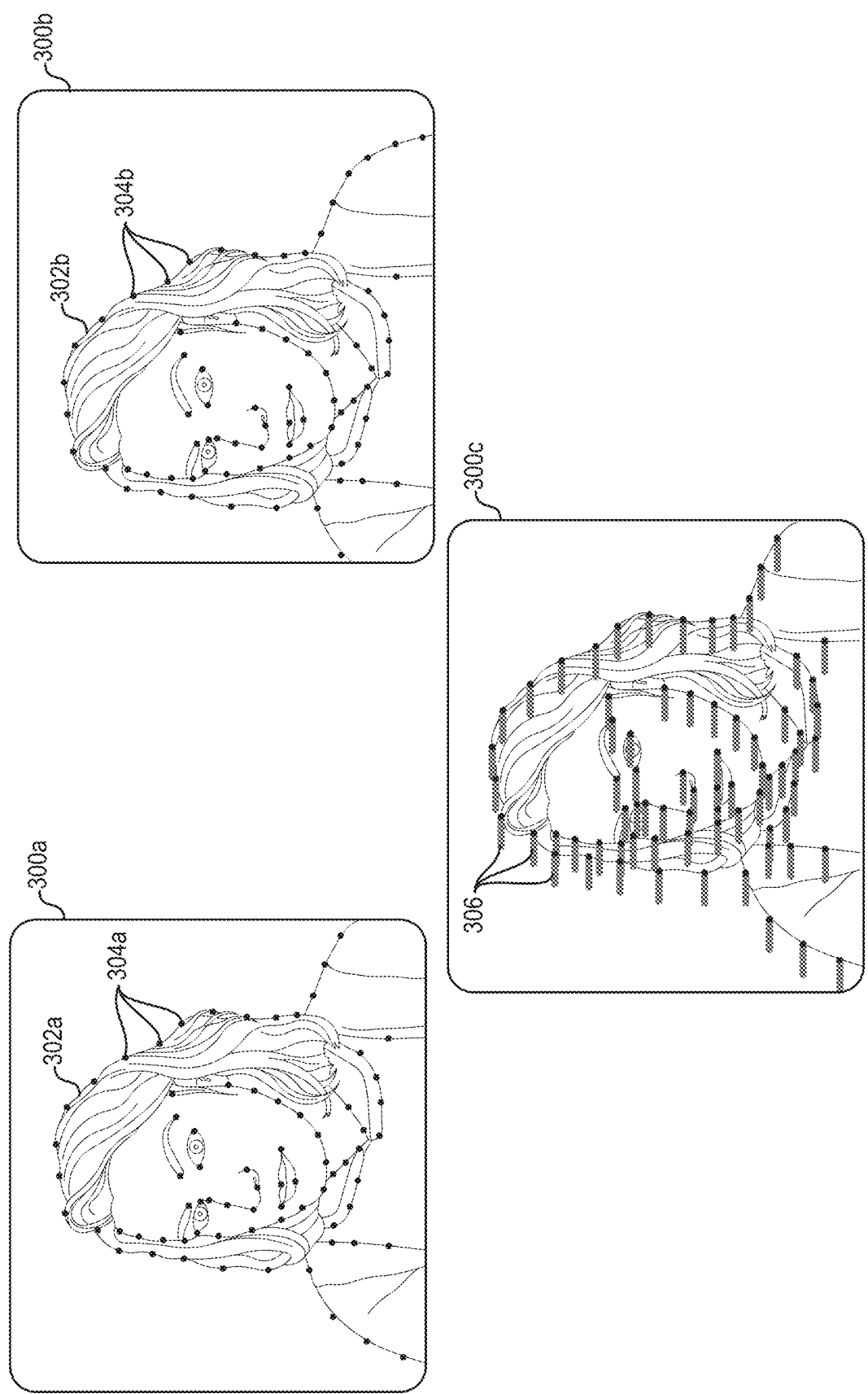
FIG. 3 illustrates a schematic of feature points of a person in a video frame in accordance with one or more embodiments.

As described above, the depth conflict reduction system analyzes an input video to identify feature points and screen disparities within the input video. Indeed, FIG. 3 illustrates a left view 300a and a right view 300b of an input video including a video object 302a, 302b (e.g., the individual depicted within the input video). The left view 300a and the right view 300b each also include feature points 304a, 304b. To illustrate, the depth conflict reduction system analyzes the input video to detect the feature point 304a, 304b.

As illustrated in FIG. 3, the depth conflict reduction system analyzes the input video to identify the feature points 304a within the left view 300a and feature points 304b within the right view 300b. To identify the feature points 304a, 304b, the depth conflict reduction system can implement an edge detection algorithm, a facial feature detection algorithm, and/or other image analysis techniques. To elaborate, the depth conflict reduction system can compare pixels values across a given frame of the input video to detect areas where there are abrupt changes in color by, for example comparing RGB values, HSV values, or other pixel values in a different color space.

For instance, the depth conflict reduction system can identify feature points 304a, 304b by detecting a change in pixel values above a particular pixel value threshold. Accordingly, the depth conflict reduction system can identify feature points 304a, 304b for areas that define edges or other prominent features of the input video. Indeed, the depth conflict reduction system can repeat the analysis for every frame of the input video.

In some embodiments, the depth conflict reduction system can identify feature points 304a, 304b within the input video using a different technique such as an optical flow method. To elaborate, the depth conflict reduction system can determine an optical flow between a left view and a right view of a user. For example, the depth conflict reduction system can determine, for the left view 300a and the right view 300b, an optical flow between feature points 304a and 304b at a particular time (e.g., at the same time) to determine a flow over a user's eye position. This is in contrast to conventional optical flow techniques that compute optical flow over time.

In addition to identifying feature points within the input video using the optical flow method, the depth conflict reduction system can further determine a depth of each of the feature points 304a, 304b using the optical flow method. To determine the depths of the feature points 304a, 304b (and, in some embodiments, to identify the feature points themselves), the depth conflict reduction system utilizes an optical flow method to perform stereo disparity measurements. Indeed, the depth conflict reduction system can implement an optical flow method to determine screen disparities between a left view 300a of the input video and a right view 300b of the input video. For example, the depth conflict reduction system can utilize the optical flow method as described in Javier Sanchez, Enric Meinhardt-Llopis, Gabriele Facciolo, *TV-L1 Optical Flow Estimation*, Image Processing On Line, 3 (2013), which is incorporated herein by reference in its entirety.

By utilizing an optical flow method, the depth conflict reduction system generates a set of flow vectors 306 that represent the screen disparities between the left and right views of each pixel for a frame of the input video as shown in FIG. 3. Accordingly, the depth conflict reduction system generates feature points 304a, 304b for input video and corresponding screen disparities of the feature points 304a, 304b. For example, the depth conflict reduction system can determine a screen disparity value for the $i^{th}$ feature point of the feature points 304a, 304b, as represented by:

$$d_i = (p_{focus,L} - p_{focus,R}) - (p_{i,L} - p_{i,R})$$

where $p_{focus}$ is the focus point of the user or the user client device (e.g., a virtual reality head-mounted display) as defined by a three-dimensional point where the screen disparity between left and right views is zero, $p_i$ is the $i^{th}$ feature point within the user's view (e.g., of the input video 300), L denotes a left view, and R denotes a right view. Accordingly, smaller negative d values indicate video objects or feature points that seem closer to the user, while positive d values indicate objects or feature points that seem farther away.

To elaborate, in some embodiments, objects within an input video that are infinitely far away have zero screen disparity, and everything closer to the user has a negative screen disparity. Thus, in these embodiments, the depth conflict reduction system can identify a particular point (e.g., $p_i$) or object within the input video as a reference point (e.g., a zero-disparity point), where objects closer than the reference point, $p_i$, have a negative disparity relative to that point and objects farther than the reference point have a positive disparity relative to that point.

As an example of determining a screen disparity for a given feature point, FIG. 4 illustrates a left view 400a and a right view 400b of an input video. Indeed, as illustrated in FIG. 4, the depth conflict reduction system identifies a feature point 404a on a video object 402a from the left view 400a and the same feature point 404b on the video object 402b in the right view 400b. The depth conflict reduction system determines a depth of a feature point by determining a screen disparity between positions of the feature point 404a, 404b.

As illustrated in FIG. 4, in some embodiments, the depth conflict reduction system determines a coordinate location of a left feature point 404a. Likewise, the depth conflict reduction system determines a coordinate location of the right feature point 404b. For example, the depth conflict reduction system can determine an x-axis (e.g., horizontal) pixel coordinate (e.g., a number of pixels from the left of the frame) and optionally a y-axis (e.g., vertical) pixel coordinate for the left and right feature points 404a, 404b. As described above, the depth conflict reduction system compares the coordinate location of the left feature point 404a with the coordinate location of the right feature point 404b to determine a screen disparity of the corresponding feature point within the input video.

Based on the screen disparities of the feature points 304, the depth conflict reduction system generates a disparity map 300c as shown in FIG. 3. In particular, the depth conflict reduction system generates a disparity map 300c that represents the screen disparities of each of the feature points 304a, 304b. While FIG. 3 illustrates a particular number of feature points 304a, 304b, the depth conflict reduction system can identify more or fewer feature points, and the depth conflict reduction system can identify feature points in additional or alternative locations within the input video.

Although FIG. 3 illustrates a still image of a frame of the input video, the depth conflict reduction system can analyze each frame of the input video using an optical flow method, edge detection method, and/or other video analysis methods. Indeed, the depth conflict reduction system can analyze the input video to identify feature points for each frame of the input video. Thus, the depth conflict reduction system can determine disparities for the feature points as within the video content.

The depth conflict reduction system compares the depths of the feature points with a depth of a user interface element. Indeed, as described in further detail below, the depth conflict reduction system compares the depth of a user interface with the depth of the feature points to place the user interface element at a depth within the input video that reduces or resolves depth conflicts.

In one or more embodiments, prior to comparing the depths of the feature points with the depth of the user interface element, the depth conflict reduction system identifies or selects a set of feature points within a region around the user interface element. Indeed, as illustrated in FIG. 5, the depth conflict reduction system identifies a set of feature points 504 that are within a threshold distance (e.g., angle) of a location of the user interface element (or location where the user interface will be placed) within the input video 500.

Figure 5:
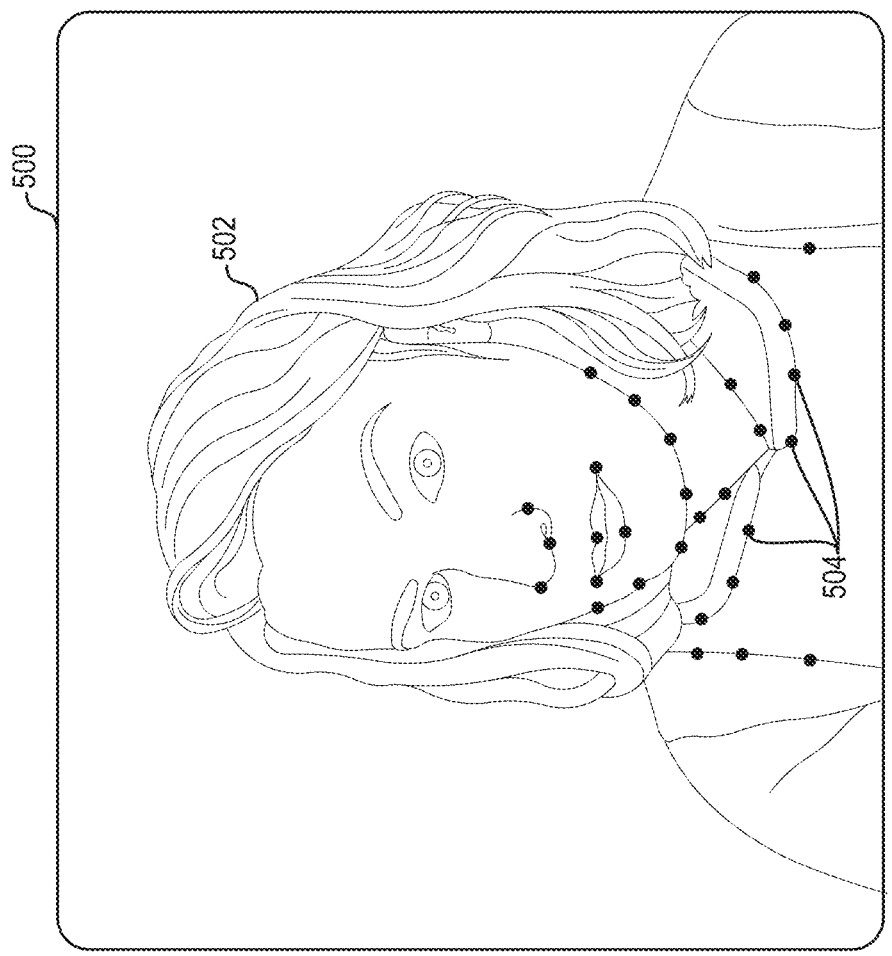
FIG. 5 illustrates identifying a set of feature points within a threshold angle of a user interface element in accordance with one or more embodiments.

As shown in FIG. 5, the depth conflict reduction system identifies a set of feature points 504 within a threshold angle of the location of the user interface element. To elaborate, the depth conflict reduction system can identify a location within the input video 500 where the depth conflict reduction system will place the center point of a user interface element. In addition, the depth conflict reduction system identifies or determines a threshold angle to thereby define a size of a region within the input video 500. To illustrate, in some embodiments the depth conflict reduction system identifies a region around the center of a user interface element location that is within 30 degrees of the where the center of the user interface element is (or is to be) located. For example, in FIG. 5, the depth conflict reduction system identifies the feature points 504 that are within 30 degrees of a center point of a location of the user interface element.

To identify the feature points 504 that are within a threshold angle, the depth conflict reduction system can define a threshold angle as an angle between by two vectors both originating at a user and projecting outward into the input video 500, where the vectors are vertically aligned, horizontally aligned, or aligned on a different axis. In some embodiments, the depth conflict reduction system defines a threshold angle by a first vector originating at a user and projecting outward into the input video 500 intersecting the location of the center of the user interface element and a second vector originating at the user and projecting outward at a particular angle relative to the first vector. In any event, the depth conflict reduction system can define a region around a user interface element as a region that is within a threshold viewing angle in any direction of the center of the user interface element.

Figure 6:
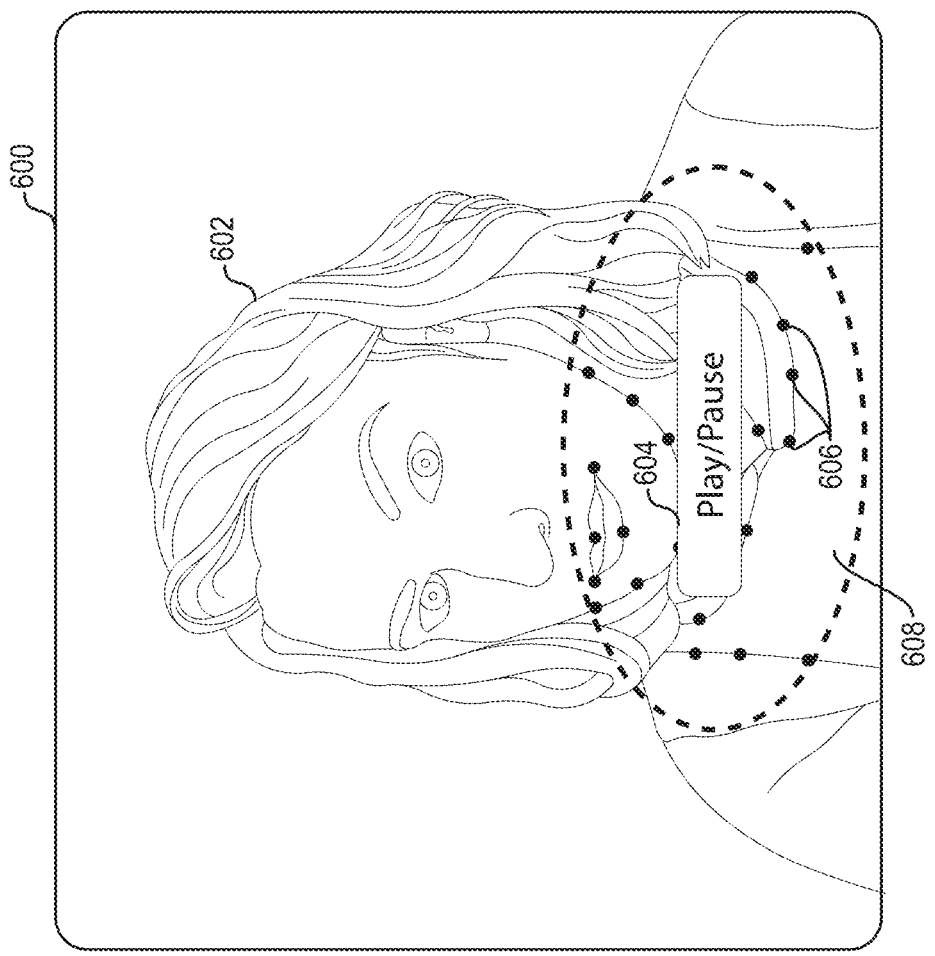
FIG. 6 illustrates a comparison of the depth of a region around a user interface element with the depth of the user interface element in accordance with one or more embodiments.

As mentioned above, the depth conflict reduction system analyzes an input video to identify a region around a user interface element as defined by a threshold angle. Indeed, the depth conflict reduction system can define a particular region that includes each (or most) of the feature points 504 that are within the threshold angle of the user interface element. As illustrated in FIG. 6, the depth conflict reduction system identifies the feature points 606 that are within the threshold angle of the user interface element 604 (e.g., region 608 around the user interface element).

While FIG. 6 illustrates the region 608 having a particular size and shape relative to the user interface element 604, in some embodiments the depth conflict reduction system can identify a region having a different size and/or shape. For example, the depth conflict reduction system can identify a region having the same shape as the user interface element 604. In other embodiments, the depth conflict reduction system can identify a region having a circular shape, a square shape, or some other regular or irregular shape. In addition, the depth conflict reduction system can identify a region having a different size than the region 608. For example, the depth conflict reduction system can identify a region that is a certain percentage larger than the user interface element 604 (e.g., 50% larger, 100% larger, etc.). In any event, the depth conflict reduction system identifies the feature points 606 that are within the region 608 defined by the threshold angle.

The depth conflict reduction system then determines an average depth of the feature points 606 and uses the average depth as a depth of the video objects (or portions thereof) in the region 608. In some embodiments, the depth conflict reduction system determines the depth of the region 608, $d_{video}$, by aggregating the d values of the feature points 606. In other embodiments, the depth conflict reduction system determines the depth of the region 608, $d_{video}$, by identifying one of the feature points 606 having a minimum depth (e.g., a depth that appears closest to the user) and utilizing the minimum depth as the depth of the region 608, $d_{video}$.

In addition, to account for variations in depth, the depth conflict reduction system can extract and analyze the top 10% smallest (e.g., most negative or closest to the user) d values, though in some embodiments the depth conflict reduction system uses the d values of all the feature points 606. Based on the d values of those feature points considered of the feature points 606, the depth conflict reduction system can determine a median d value. Furthermore, the depth conflict reduction system filters the data (e.g., the d values and/or the median d value) using a moving window method from the last 10 data points to reduce noise. Focusing on the smaller d values, the depth conflict reduction system more heavily considers those video objects that attract more user attention and that take up more viewing space within a user's view and are therefore more likely to cause depth conflicts.

The depth conflict reduction system generates a final $d_{video}$ value that represents a smoothed screen disparity of the region 608. Indeed, the depth conflict reduction system can utilize the $d_{video}$ value as a proxy to estimate perceived depth of the region 608 around the user interface element 604. In other embodiments, however, rather than determining a median d value for the feature points 606 within the threshold angle of the user interface element 604, the depth conflict reduction system can determine a mean value of all or some of the feature points 606. The depth conflict reduction system can thus utilize the mean value of the feature points 606 as a depth of the region 608.

In addition, as described above, the depth conflict reduction system determines the depth of the user interface element 604. To determine the depth of the user interface element 604, the depth conflict reduction system identifies a center point of the user interface element 604. Utilizing the technique disclosed above, the depth conflict reduction system determines the screen disparity, $d_{UI}$, between a left view of the center point of the user interface element 604 and a right view of the center point of the user interface element 604.

As mentioned, the depth conflict reduction system also compares the depth of the region 608, $d_{video}$, with the depth of the user interface element 604, $d_{UI}$. Indeed, the depth conflict reduction system can determine a difference between $d_{video}$ and $d_{UI}$. In addition, the depth conflict reduction system identifies a depth conflict between the region 608 and the user interface element 604 when the absolute difference between $d_{video}$ and $d_{UI}$ is larger than a depth threshold—i.e., when the depth $d_{UI}$ is more than a depth threshold greater than $d_{video}$. For example, the depth conflict reduction system can use a depth threshold of a particular number of pixels of screen disparity such as 5 or 10, etc. Accordingly, when the depth conflict reduction system determines that the difference between $d_{video}$ and $d_{UI}$ is larger than the depth threshold, the depth conflict reduction system determines that there is a depth conflict between the user interface element 604 and the region 608. Conversely, if the depth conflict reduction system determines that $d_{video}$ is larger than $d_{UI}$, then the depth conflict reduction system determines that there is no depth conflict because the occlusion cue matches the stereopsis cue.

In some embodiments, the depth conflict reduction system uses a depth threshold based on the depths of the feature points 606. For example, the depth conflict reduction system may use a smaller depth threshold in cases where the feature points 606 have relatively small or shallow depths and appear closer to the user, while the depth conflict reduction system may use a larger depth threshold in cases where the feature points 606 have larger depths and appear farther away. In other embodiments, however, the depth conflict reduction system utilizes a predefined depth threshold to enable the depth conflict reduction system to more quickly trigger any necessary depth adjustment of the user interface element 604.

To illustrate, when the depth conflict reduction system determines that a depth conflict exists between the user interface element 604 and the region 608, the depth conflict reduction system modifies the user interface element 604 to avoid, reduce, or resolve the identified depth conflict. For example, the depth conflict reduction system can modify the depth the of the user interface element 604 by reducing the depth of the user interface element 604 to effectively move the user interface element 604 closer within the view of the user.

On the other hand, if the depth conflict reduction system determines that no depth conflict exists between the user interface element 604 and the region 608, the depth conflict reduction system can position the user interface element 604 at a default depth. For example, the depth conflict reduction system may refrain from modifying the depth of the user interface element 604 and may instead leave the user interface element 604 at its current depth. In some embodiments, however, the depth conflict reduction system can move the user interface element 604 deeper in response to detecting that no depth conflict exists. For example, the depth conflict reduction system can increase the depth of the user interface element 604 to position the user interface element 604 at a depth threshold from the depth of the region 608.

To adjust the depth of the user interface element 604, the depth conflict reduction system can adjust frustums associated with the user's view of the input video 600. In particular, the depth conflict reduction system can adjust a left frustum that corresponds to a left view of the input video 600 and can adjust a right frustum that corresponds to a right view of the input video 600. To elaborate, the depth conflict reduction system can adjust a left and/or right frustum horizontally to change $d_{UI}$. In some embodiments, by shifting the left and right frustums inward, the depth conflict reduction system makes the user interface element 604 appear closer within the view of the user. Conversely, by shifting the frustums outward, the depth conflict reduction system makes the user interface element 604 appear farther away. Advantageously, the depth conflict reduction system utilizes frustums to adjust the view of the user interface element 604 independently from the view of the input video 600. Thus, by shifting the frustums to change the depth of the user interface element 604, the depth conflict reduction system does not affect the depth perception of the video object 602 within the input video 600. Indeed, to change $d_{UI}$ in this way, in some embodiments the depth conflict reduction system can adjust frustums according to the technique described in Thomas Oskam, Alexander Hornung, Huw Bowles, Kenny Mitchell, and Markus Gross. 2011. *OSCAM—Optimized Stereoscopic Camera Control for Interactive* 3D. In Proceedings of the 2011 SIGGRAPH Asia Conference on—SA '11. ACM Press, New York, N.Y., USA, 1, which is incorporated herein by reference in its entirety.

Furthermore, in cases where there are multiple user interface elements presented with an input video, the depth conflict reduction system can shift frustums associated with each respective user interface element independently to adjust depths and correct depth conflicts for each user interface element. Indeed, the depth conflict reduction system can set and adjust the depths of each user interface element irrespective of the other user interface elements. For example, in cases where a first user interface element is in conflict with video objects, and where a second user interface element is not, the depth conflict reduction system can implement the techniques described above to adjust the frustums associated with the first user interface element while refraining from adjusting frustum associated with the second user interface element. Alternatively, the depth conflict reduction system can adjust a first frustum associated with a first user interface element a first amount to adjust the first user interface element and also adjust a second frustum a second amount to adjust a second user interface element a different amount than the first user interface element.

As mentioned, the depth conflict reduction system modifies the depth of the user interface element 604. In particular, the depth conflict reduction system can modify the depth of the user interface element 604 at a particular speed or rate. For example, the depth conflict reduction system can increase or decrease the depth of the user interface element 604 quickly or slowly. Indeed, an important consideration in adjusting or shifting one or more frustums to modify the depth of the user interface element 604 is the rate of change of that depth. The depth conflict reduction system utilizes a rate of change of the depth, δ (measured in arcmin per second), that is comfortable or less distracting to a user. Additionally, the depth conflict reduction system utilizes a δ that is fast enough to resolve a depth conflict between the user interface element 604 and the region 608 in a timely manner.

To balance the tradeoff between a δ that is too fast so as to be a distraction and a δ that is too slow so as to be effective, the depth conflict reduction system can utilize a predefined default rate for δ. In some embodiments, the depth conflict reduction system can utilize more than one default rate, depending on the depth of the user interface element 604. For example, in cases where the user interface element 604 needs to move closer to the user (e.g., by decreasing its depth), the depth conflict reduction system can utilize a first default rate (e.g., an advancing default rate) of 60 arcmin/s. In cases where the user interface element 604 needs to move farther away from the user (e.g., by increasing its depth), the depth conflict reduction system can utilize a second default rate (e.g., a receding default rate) of 30 arcmin/s. While the depth conflict reduction system may utilize rates of 60 arcmin/s and 30 arcmin/s in some embodiments, in other embodiments, the depth conflict reduction system can utilize different default rates. In these or other embodiments, the depth conflict reduction system can utilize an advancing default rate that is faster than the receding default rate to accommodate moving the user interface element 604 more quickly when there is a depth conflict with the video object 602 and moving the user interface element more slowly when there is no such depth conflict.

In some embodiments the depth conflict reduction system adjusts the depth of the user interface element 604 at a rate faster than the default rate. In particular, the depth conflict reduction system can utilize a faster δ when doing so would not cause discomfort or distraction for the user. Indeed, when objects (e.g., the user interface element 604 and/or the video object 602) move quickly, the user may experience the phenomenon of change blindness, which is an ideal circumstance in which to more quickly change the depth of the user interface element 604. Thus, when the depth conflict reduction system determines that the user interface element 604 is moving at or above a speed threshold, the depth conflict reduction system can increase δ to a rate faster than the default rate because the user is unlikely to notice the faster change during such movement.

To illustrate by an example, a user wearing a virtual reality head-mounted display may view the input video 600 including the video object 602 and the user interface element 604. If the user rotates or turns his or her head quickly, the user interface element 604 and/or the video object 602 moves quickly within the view of the user. In response to detecting movement of the user interface element 604 and/or the video object 602 that exceeds a speed threshold (e.g., 7 m/s, 10 m/s, etc.), the depth conflict reduction system increases δ to modify the depth of the user interface element 604 more quickly. Indeed, the depth conflict reduction system adjusts the user interface element 604 to avoid any depth conflicts with the video object 602 fast enough so that the depth conflict reduction system repositions the user interface element 604 before the user stops moving. Due to the movement that the user sees as a result of moving his or her head, the user is unlikely to notice changes in the user interface element 604, so the faster δ allows the depth conflict reduction system to more quickly reduce or resolve depth conflicts without distracting or discomforting the user.

As another example, the user may move the user interface element 604 within the input video manually. In particular, the user may use a user interaction or input by way of a handset, touchscreen, etc., to drag or otherwise relocate the user interface element 604 within the input video 600. If the user moves the user interface element 604 faster than a speed threshold, then the depth conflict reduction system modifies the depth of the user interface 604 at a rate faster than the default rate.

In these or other embodiments, the depth conflict reduction system can utilize a variable rate that increases or decreases depending on the speed of movement of the user interface element 604 and/or the video object 602. To illustrate, the depth conflict reduction system can monitor the speed of movement of the user interface element 604 and/or the speed of movement of the video object 602. When the depth conflict reduction system detects a depth conflict between the user interface element 604 and the video object 602, the depth conflict reduction system can modify the depth of the user interface element 604 more slowly when the depth conflict reduction system detects slow movement of the user interface element 604 and/or the video object (e.g., as the user slowly turns his or her head). Conversely, when the depth conflict reduction system detects faster movement of the user interface element 604 and/or the video object 602, the depth conflict reduction system can increase δ to modify the depth of the user interface element 604 more quickly.

As illustrated in FIG. 6, the depth conflict reduction system may further apply a depth range to user interface element 604. In particular, the depth conflict reduction system can limit how close and how far the depth conflict reduction system can position the user interface element 604. Indeed, if the user interface element 604 is too close within a user's view, it could cause discomfort, and if the user interface element 604 is too far within the user's view, then the user may not be able to see it clearly. Accordingly, the depth conflict reduction system can implement a depth range such as, for example, a range based on recommendations of a manufacturer of a user client device.

While FIG. 6 illustrates a particular method whereby the depth conflict reduction system analyzes the input video 600 to determine depths of feature points 606, a region 608, and a user interface element 604, in some embodiments the depth conflict reduction system can implement a different technique. For example, the depth conflict reduction system can access depth information for the video object 602 within the input video 600 from a depth map. Indeed, in cases where the input video 600 is prerecorded or pre-generated, the input video 600 may include additional data. For instance, a recording device may record the input video 600 and may further capture additional information associated with the input video 600 such as depth information. In some cases, the depth conflict reduction system may have access to a detailed depth map that corresponds to the input video 600 and that includes depth information for various portions of the video object 602. Accordingly, the depth conflict reduction system can position and modify the user interface element 604 based on the depth information of the video object 602, in accordance with the disclosure herein.

As described above, the depth conflict reduction system can resolve or reduce depth conflicts by modifying the depth of a user interface element (e.g., user interface element 604) as well as (or alternatively) by applying a visual effect (e.g., a blurring effect, a color effect) to a region around a user interface element. Indeed, FIG. 7 illustrates applying a blurring effect to a region around a user interface element.

Figure 7:
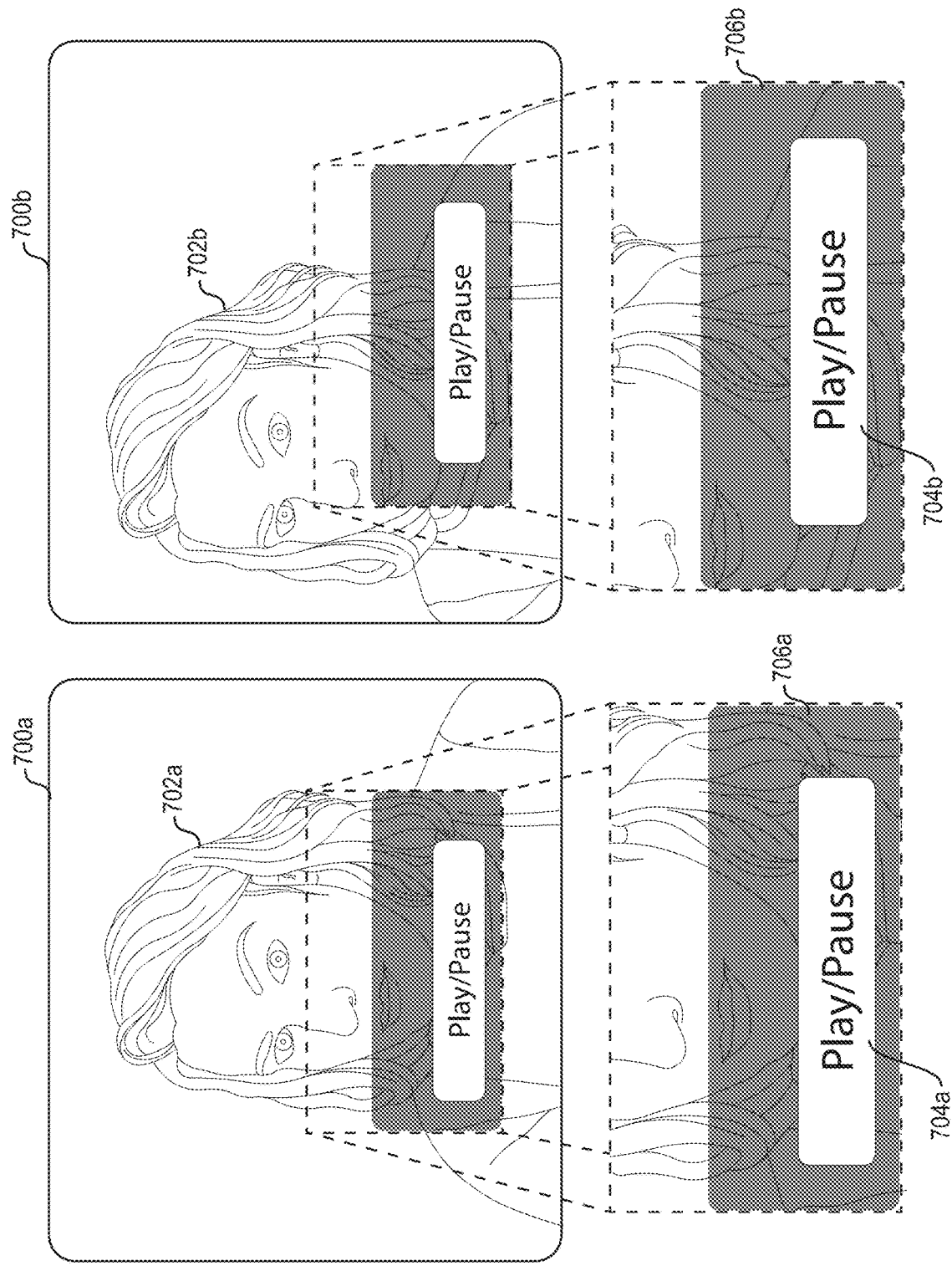
FIG. 7 illustrates user interfaces of a stereoscopic video showing a blurring texture around a user interface element in accordance with one or more embodiments.

As illustrated in FIG. 7, the depth conflict reduction system can analyze a left view 700a and a right view 700b of an input video. Indeed, the depth conflict reduction system can identify a left user interface element 704a (i.e., a left view of a user interface element) and a right user interface element 704b (i.e., a right view of a user interface element). Based on a location of a center point of the left user interface element 704a and/or a location of a center point of the right user interface element 70b, the depth conflict reduction system can determine a location of the user interface element within the input video. In addition, the depth conflict reduction system can detect depth conflicts with any video objects by determining a depth of the user interface element and any video objects within the input video in accordance with this disclosure.

Upon identifying a depth conflict, the depth conflict reduction system can apply a blurring effect to a region around the user interface element to reduce or resolve the depth conflict. In alternative embodiments, the depth conflict reduction system can apply a blurring effect to a region around the user interface element at all times rather than just when a depth conflict occurs. As illustrated in FIG. 7, the depth conflict reduction system can apply a blurring effect as represented by a left canvas 706a (i.e., a left view of a blurred texture canvas or overlay) and a right canvas 706b (i.e., a right view of a blurred texture canvas or overlay). Indeed, the depth conflict reduction system can apply a blurring effect by generating and overlaying a blurred texture canvas over a portion of the input video directly behind the user interface element to effectively blur a region around the user interface element.

As illustrated in FIG. 7, the depth conflict reduction system can generate a left canvas 706a that is in a different position relative to the left video object 702a than the right canvas 706b is relative to the right video object 702b. Indeed, as shown, the left canvas 706a is more centered on the face of the individual represented by the left video object 702a, while the right canvas 702b is more off-center. Additionally, in each respective view (e.g., the left view 700a and the right view 700b), the depth conflict reduction system centers the user interface element within the corresponding texture canvas, or else positions the texture canvas with the user interface element at its center.

By applying a visual effect, such as a blurring effect, around the user interface element, the depth conflict reduction system can weaken the stereopsis cue of a user as well as reduce binocular rivalry that can otherwise result left and right views displaying differences in user interface element positions. In this way, the depth conflict reduction system can mask high-frequency spatial information, and can thereby, reduce or resolve depth conflicts between user interface elements and video content.

To achieve a blurring effect, as mentioned, the depth conflict reduction system can apply a texture canvas behind the user interface element. Indeed, the depth conflict reduction system can apply a texture canvas that has a depth slightly greater than the user interface element. In addition, the depth conflict reduction system can apply a texture canvas that has larger dimensions than the user interface element. For example, the depth conflict reduction system can generate a texture canvas that is a first number of pixels wider and a second number of pixels taller than the user interface element. As another example, the depth conflict reduction system can generate a texture canvas that is proportional to the user interface element and that is a certain percentage larger in area than the user interface element (e.g., 10% larger, 20% larger, etc.).

For each pixel within the texture canvas, the depth conflict reduction system can apply a fragment shader technique to identify a color of the corresponding pixel (e.g., the pixel over which that particular part of the canvas lies) of the input video. For example, the depth conflict reduction system can identify the color of the corresponding pixel from previous rendering passes. In addition, the depth conflict reduction system can utilize the fragment shader technique to apply a Gaussian blur kernel to each pixel covered by the canvas. By applying a Gaussian blur, the depth conflict reduction system can create a gradient effect for the blurred texture canvas, varying the intensity or strength of the blur. Indeed, the depth conflict reduction system can apply a Gaussian blur to be the most intense at the center and gradually diminish in strength as it progresses outward.

Figure 8:
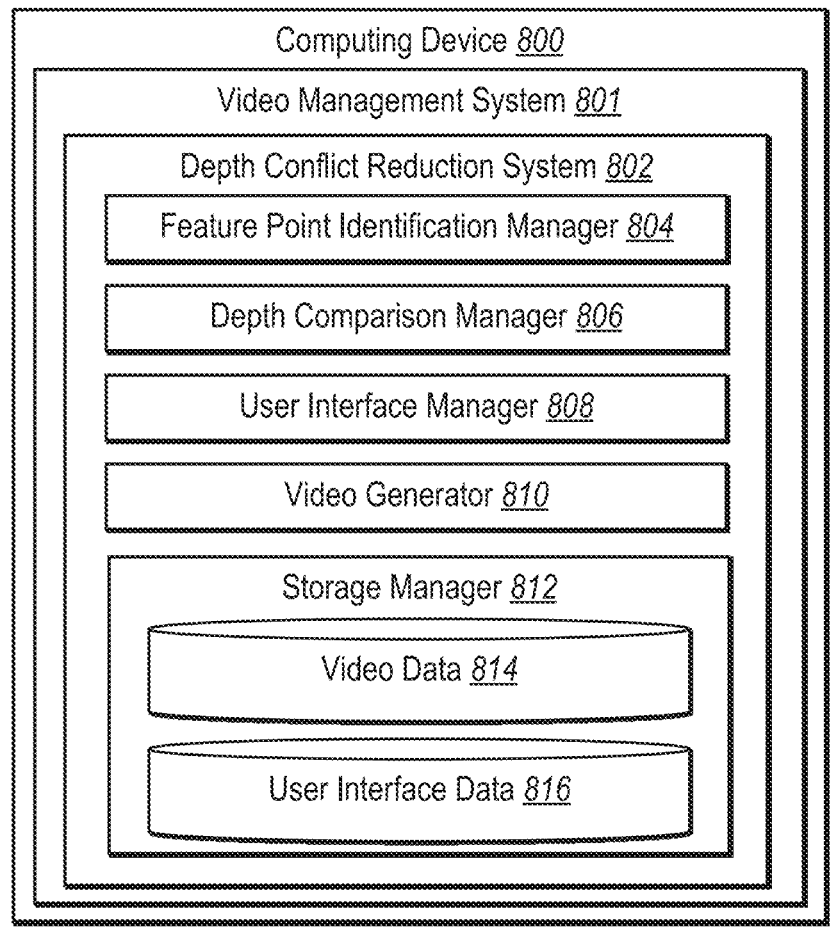
FIG. 8 illustrates a schematic diagram of a depth conflict reduction system in accordance with one or more embodiments.

Looking now to FIG. 8, additional detail will be provided regarding components and capabilities of the depth conflict reduction system. Specifically, FIG. 8 illustrates an example schematic diagram of a depth conflict reduction system 802 implemented by an example computing device 800 (e.g., a user client device and/or server device). As shown in FIG. 8, the depth conflict reduction system 802 may include a feature point identification manager 804, a depth comparison manager 806, a user interface manager 808, a video generator 810, and a storage manager 812.

As mentioned, the depth conflict reduction system 802 includes a feature point identification manager 804. In particular, the feature point identification manager 804 can analyze an input video to identify, determine, detect, or discover feature points within the input video. For example, the feature point identification manager 804 can perform edge detection, facial analysis, and/or other image or video analysis methods to identify significant portions of the input video to designate as feature points. The feature point identification manager 804 can also (or alternatively) perform the optical flow method described above to identify feature points and to further determine the depths (e.g., the screen disparities) of the identified feature points. Furthermore, the feature point identification manager 804 can determine or identify a region around a user interface element based on a set of feature points within a threshold angle of the user interface element.

As shown, the depth conflict reduction system 802 also includes a depth comparison manager 806. In particular, the depth comparison manager 806 can determine, measure, identify, or detect the depth of a user interface element in accordance with this disclosure. For example, the depth comparison manager 806 can determine a screen disparity for the center point of a user interface element. In addition, the depth comparison manager 806 can compare, contrast, measure, or a determine a difference between, the depth of the user interface element and the depth of one or more of the feature points identified within the input video. As an example, the depth comparison manager 806 can compare the depth of the user interface element with the depth of a region around the user interface element. In addition, the depth comparison manager 806 can identify, determine, or detect depth conflicts between user interface elements and video content (e.g., objects within the input video).

As further illustrated in FIG. 8, the depth conflict reduction system 802 includes a user interface manager 808. In particular, the user interface manager 808 can provide one or more user interface elements for display by way of a user client device. To illustrate, the user interface manager 808 can adjust, modify, alter, or otherwise change the depth of a user interface element. Indeed, the user interface manager 808 can communicate with the depth comparison manager 806 to, based on detecting a depth conflict, modify the depth of a user interface element to avoid, reduce, or resolve the depth conflict.

As shown, the depth conflict reduction system 802 also includes a video generator 810. In particular, the video generator 810 can create, generate, provide, present, and/or display an output video. For example, the video generator 810 can generate an output video including video content from an input video as well as one or more user interface elements. The video generator 810 can generate the output video to provide to a user client device while the depth comparison manager 806 and/or the feature point identification manager 804 simultaneously analyzes the input video and overlays a user interface element to avoid depth conflicts. Furthermore, the video generator 810 can generate or create a blurring effect to apply to a region around a user interface element. For example, the video generator 810 can generate a blurred texture canvas having dimensions larger than the user interface element and centered around the user interface element to effectively blur a region of the input video around the user interface element.

As also shown, the depth conflict reduction system 802 includes a storage manager 812. In particular, the storage manager 812 can include, store, maintain, or manage video data 814 and user interface data 816. For example, the storage manager 812 can communicate with the feature point identification manager 804 to store feature point information such as location, depth, etc., in the video data 814. In addition, the storage manager 812 can communicate with the depth comparison manager 806 to store user interface element information such as location, depth, etc., associated with user interface elements in the user interface data 816. Thus, the components of the depth conflict reduction system 802 can communicate with the storage manager 812 to access video data 814 and user interface data 816 for comparing depths of user interface elements and feature points, and for adjusting user interface elements to avoid depth conflicts.

In one or more embodiments, each of the components of the depth conflict reduction system 802 are in communication with one another using any suitable communication technologies. Additionally, the components of the depth conflict reduction system 802 can be in communication with one or more other devices including one or more of the user client devices describe below in relation to FIG. 9. It will be recognized that although the components of the depth conflict reduction system 802 are shown to be separate in FIG. 8, any of the subcomponents may be combined into fewer components, such as into a single component, or divided into more components as may serve a particular implementation. Furthermore, although the components of FIG. 8 are described in connection with the depth conflict reduction system 802, at least some of the components for performing operations in conjunction with the depth conflict reduction system 802 described herein may be implemented on other devices within the environment.

The components of the depth conflict reduction system 802 can include software, hardware, or both. For example, the components of the depth conflict reduction system 802 can include one or more instructions stored on a computer-readable storage medium and executable by processors of one or more computing devices (e.g., the computing device 800). When executed by the one or more processors, the computer-executable instructions of the depth conflict reduction system 802 can cause the computing device 800 to perform the patch matching methods described herein. Alternatively, the components of the depth conflict reduction system 802 can comprise hardware, such as a special purpose processing device to perform a certain function or group of functions. Additionally, or alternatively, the components of the depth conflict reduction system 802 can include a combination of computer-executable instructions and hardware.

Furthermore, the components of the depth conflict reduction system 802 performing the functions described herein may, for example, be implemented as part of a stand-alone application, as a module of an application, as a plug-in for applications including content management applications, as a library function or functions that may be called by other applications, and/or as a cloud-computing model. Thus, the components of the depth conflict reduction system 802 may be implemented as part of a stand-alone application on a personal computing device or a mobile device. Alternatively or additionally, the components of the depth conflict reduction system 802 may be implemented in another application, such as the video management system 801, that allows creation and delivery of content to users, including, but not limited to, applications in ADOBE® CREATIVE CLOUD® such as ADOBE® PHOTOSHOP®, ADOBE® PREMIERE®, ADOBE® ANIMATE®, ADOBE® FUSE®, and ADOBE® SPARK®. "ADOBE," "PHOTOSHOP," "PREMIERE," "CREATIVE CLOUD," "ANIMATE," "FUSE," and "SPARK" are registered trademarks of Adobe Systems Incorporated in the United States and/or other countries.

Figure 9:
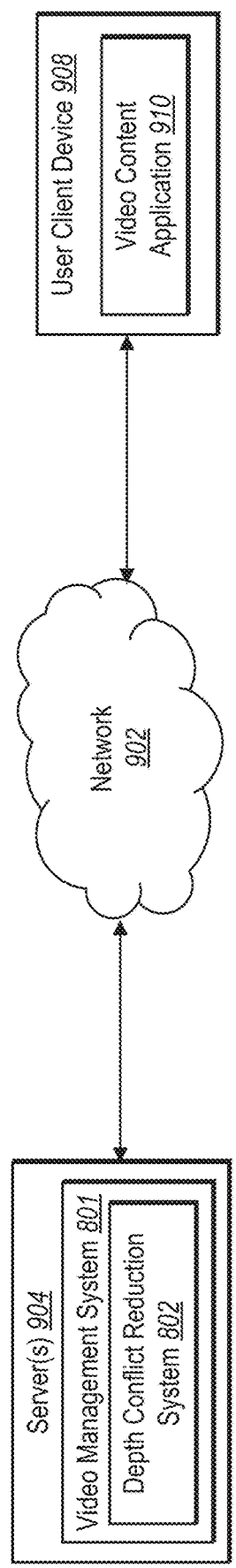
FIG. 9 illustrates an example environment in which the depth conflict reduction system of FIG. 8 can operate in accordance with one or more embodiments.

FIG. 9 illustrates a schematic diagram of one embodiment of an exemplary environment in which the depth conflict reduction system 802 operates. In one or more embodiments, the exemplary environment includes a network 902, server(s) 904, and a user client device 908 including a video content application 910. While FIG. 9 illustrates a particular arrangement of the components of the environment, the environment may have additional or alternative arrangements.

As illustrated in FIG. 9, the environment may include a network 902. In particular, the network 902 can interface the server(s) 904 and the user client device 908. Accordingly, the network 902 can facilitate communications between the server(s) 904 and the user client device 908 via appropriate network protocol. For example, the network 902 may refer to a local network (e.g., a local area network or "LAN") or a wide area network ("WAN") or may refer to different communication protocol by which two computing devices can communicate.

As also illustrated in FIG. 9, the environment may include server(s) 904. The server(s) 904 may refer to one or more computing devices that can manage video content including capturing and/or displaying 360-degree video content in addition to user interface elements. In particular, the server(s) 904 can communicate, via network 902, with the video content application 910 on (e.g., implemented by) the user client device 908. Accordingly, the server(s) 904 can communicate with the video content application 910 to enable a user to interact with a digital video by way of the video content application 910 to view, edit, or otherwise manipulate the video content.

Additionally, the server(s) 904 can execute or implement the depth conflict reduction system 802. Although FIG. 9 illustrates the depth conflict reduction system 802 being implemented by the server(s) 904, it will be appreciated that one or more components of the depth conflict reduction system 802 can be implemented in any of the components of the environment 900, such as for example the client device 908.

Although FIG. 9 illustrates a particular arrangement of the environment including the server(s) 904, the network 902, and the user client device 908, various additional or alternative arrangements are possible. For example, while FIG. 9 illustrates a single user client device 908 in communication with a network 902 and the server(s) 904, in one or more embodiments multiple user client devices may communicate directly with the server(s) 904, bypassing network 902.

To illustrate, the user client device 908 can communicate with the server(s) 904 to display video content provided by the server(s) 904. For example, the user client device 908 can display 360-degree video content including a user interface element provided by the server(s) 904. The server(s) 904 utilize the depth conflict reduction system 802 to analyze the video content to identify the depth of a region around the user interface element, as described above. Upon further determining the depth of the user interface element, the depth conflict reduction system 802 can compare the depth of the user interface element with the depth of the region around the user interface element and can modify the depth of the user interface element to void any depth conflicts. The server(s) 904 can communicate with the user client device 908 to render or otherwise display any changes or modifications made to the user interface element and/or, in cases where the server(s) generates a blurred texture canvas to reduce depth conflicts, a region around the user interface element.

FIGS. 1-9, the corresponding text, and the examples provide a number of different systems, methods, and non-transitory computer readable media for modifying a user interface element within video content to avoid depth conflicts. In addition to the foregoing, embodiments can also be described in terms of flowcharts comprising acts for accomplishing a particular result. For example, FIG. 10 illustrates a flowchart of an example sequence of acts in accordance with one or more embodiments.

Figure 10:
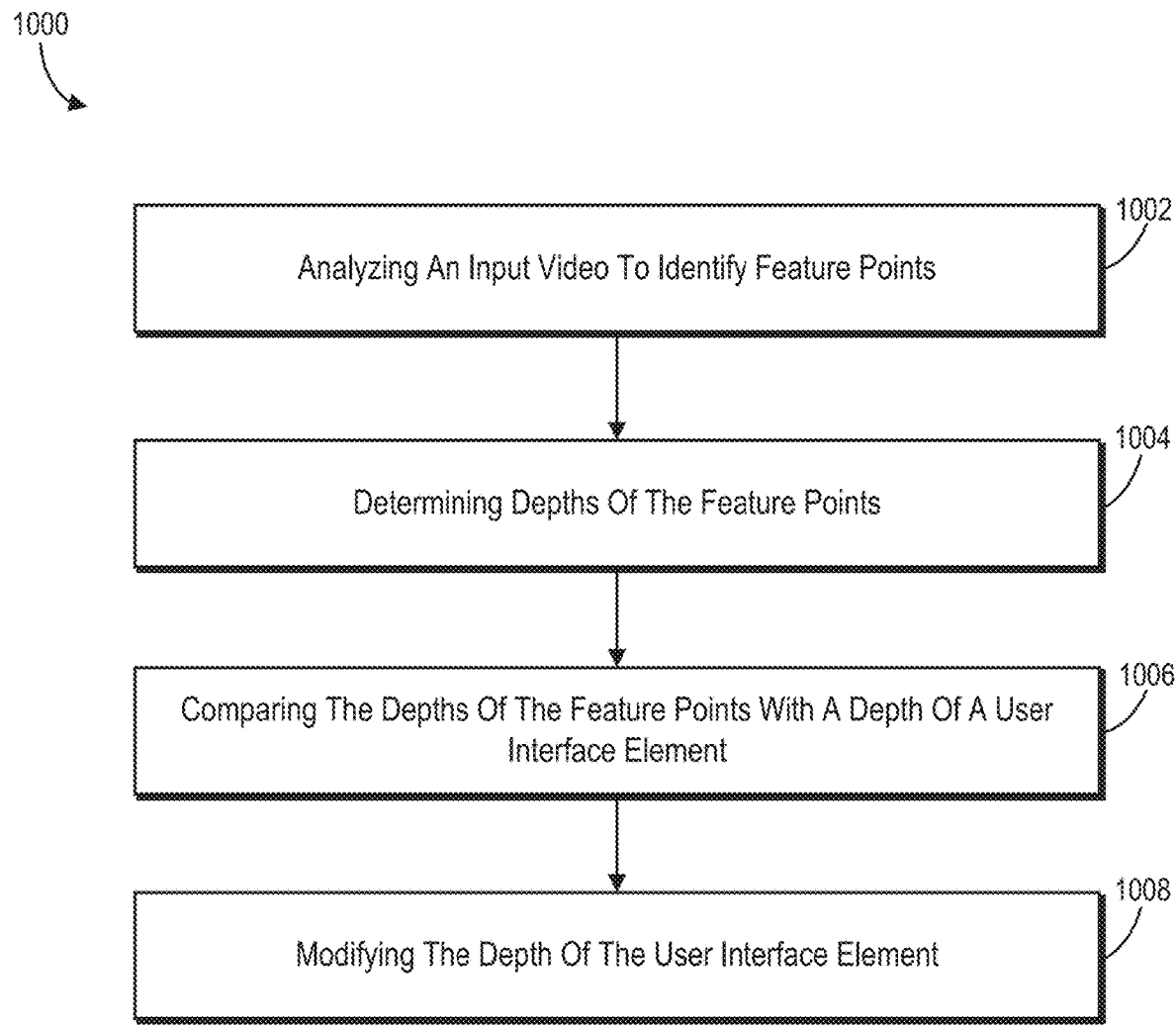
FIG. 10 illustrates a flowchart of a series of acts for modifying the depth of a user interface element to avoid depth conflicts in accordance with one or more embodiments.

While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the acts described herein may be repeated or performed in parallel with one another or in parallel with different instances of the same or other similar acts.

FIG. 10 illustrates an example series of acts 1000 of modifying a user interface element within video content to avoid depth conflicts. In particular, the series of acts 1000 includes an act 1002 of analyzing an input video to identify feature points. For example, the act 1002 can involve analyzing an input video to identify feature points within the input video by comparing pixels to detect edges within the input video.

In addition, the series of act 1000 can include an act 1004 of determining depths of the feature points. In particular, the act 1004 can involve determining, based on analyzing the input video, depths of the feature points within the input video by calculating screen disparities between a left view of the feature points and a right view of the feature points. The act 1004 can further involve determining, for each feature point, a screen disparity between a left view of the feature point within the input video and a right view of the feature point within the input video.

As shown, the series of acts 1000 can also include an act 1006 of comparing the depths of the feature points with a depth of a user interface element. In particular, the act 1006 can involve comparing the depths of the feature points with a depth of a user interface element within the input video by determining a difference between the depths of the feature points and the depth of the user interface element. The act 1006 can further involve determining the depth of the user interface element by determining a screen disparity between a left view of a center point of the user interface element and a right view of the center point of the user interface element. The act 1006 an also or alternatively involve determining a difference between the depth of the region of the input video that is within the threshold angle of the user interface element and the depth of the user interface element.

As further illustrated in FIG. 10, the series of acts 1000 can include an act 1008 of modifying the depth of the user interface element. In particular, the act 1008 can involve dynamically modifying, based on the comparison of the depths of the feature points with the depth of the user interface element, the depth of the user interface element to avoid depth conflicts with the feature points. The act 1008 can further involve minimizing the difference between the depth of the region of the input video that is within the threshold angle of the user interface element and the depth of the user interface element. The act 1008 an also or alternatively involve adjusting a frustum associated with a left view of the user interface element within the input video and a frustum associated with a right view of the user interface element within the input video.

The act 1008 can further involve, based on detecting a depth conflict between the user interface element and the region of the input video that is within the threshold angle of the user interface element, modifying the depth of the user interface element within the input video by decreasing the depth of the user interface element. Additionally, or alternatively, the act 1008 can involve, based on determining that there is no depth conflict between the user interface element and the region of the input video that is within the threshold angle of the user interface element, modifying the depth of the user interface element by increasing the depth of the user interface element.

The series of acts 1000 can further includes acts of identifying a set of feature points that are within a threshold angle of the user interface element, identifying depths for the set of feature points that are within the threshold angle of the user interface element, and determining, based on the depths of the set of feature points that are within the threshold angle of the user interface element, a depth of a region of the input video that is within the threshold angle of the user interface.

Although not illustrated in FIG. 10, the series of acts 1000 can also include an act of detecting that the user interface element is moving slower than a movement threshold. In these embodiments, the series of acts 1000 can include an act of, in response to detecting that the user interface element is moving slower than the movement threshold, adjusting the frustum associated with the left view and the frustum associated with the right view at a default rate. Additionally or alternatively, the series of acts 1000 can include an act of detecting that the user interface element is moving faster than a movement threshold, and can include an act of, in response to detecting that the user interface element is moving faster than the movement threshold, adjusting the frustum associated with the left view and the frustum associated with the right view at a rate faster than a default rate.

Figure 11:
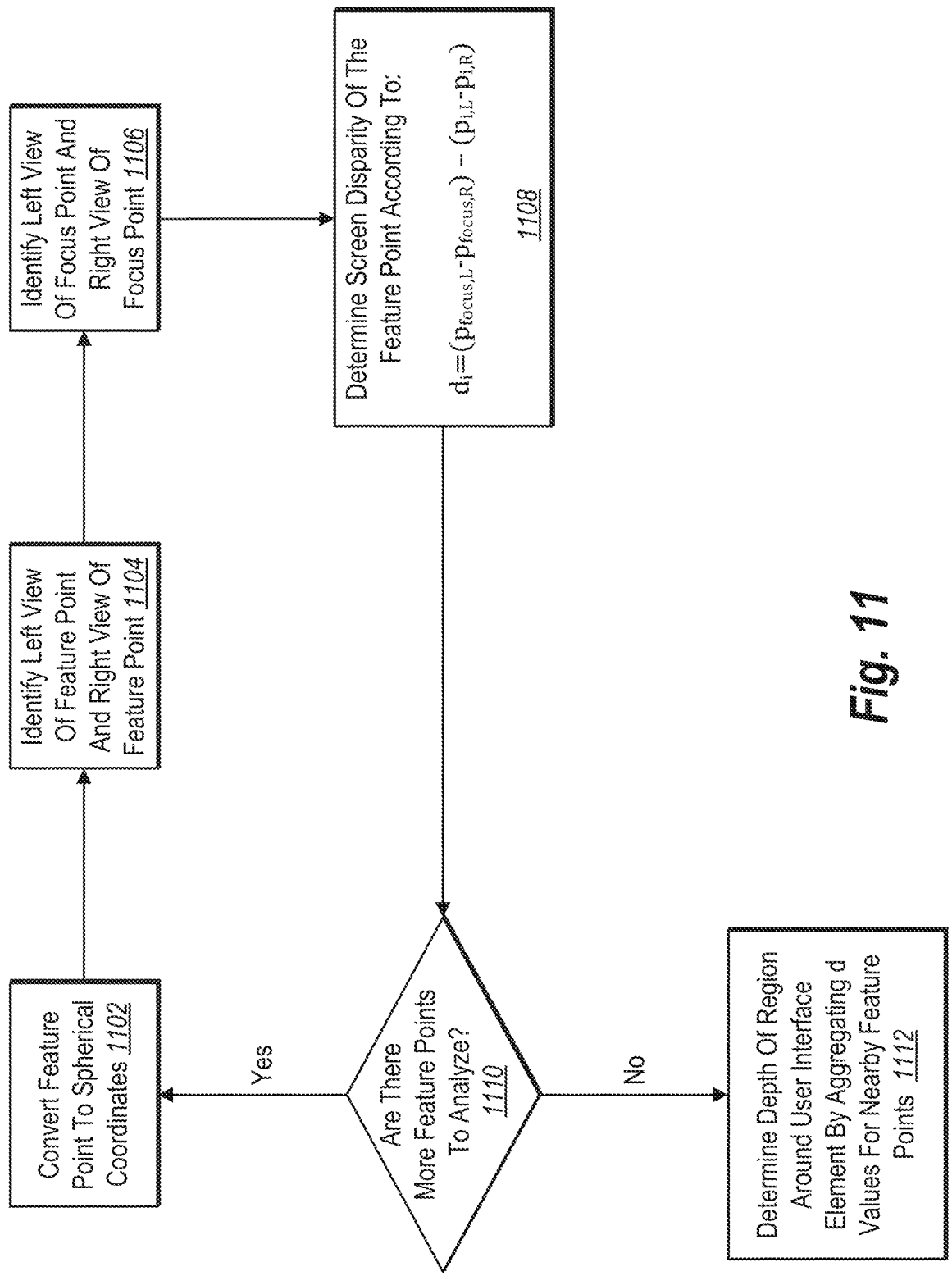
FIG. 11 illustrates a series of acts in a step for determining depths of the feature points within the input video in accordance with one or more embodiments.

As mentioned above, the depth conflict reduction system can determine depths of feature points identified within an input video. Indeed, FIG. 11 illustrates a step for determining depths of the feature points within the input video in accordance with one or more embodiment of the depth conflict reduction system described herein. The step for determining depths of the feature points within the input video can include the below description of FIG. 11, in addition to relevant methods and techniques described elsewhere in this disclosure.

As illustrated in FIG. 11, the step for determining depths of the feature points within the input video can include acts 1102-112. In particular, the depth conflict reduction system can perform act 1102 to convert a feature point to spherical coordinates. Indeed, the act 1102 can include identifying a feature point within an input video and converting the identified feature point to spherical coordinates. In addition, the depth conflict reduction system can perform act 1104 to identify a left view of the feature point and a right view of the feature point. Indeed, the depth conflict reduction system can identify a view of the feature point associated with a user's left eye or associated with a left camera, and a view of the feature point associated with a user's right eye or associated with a right camera.

As shown, the depth conflict reduction system can further perform act 1106 to identify a left view of a focus point and a right view of a focus point. Indeed, the depth conflict reduction system can identify a focus point within the input video, defined as a point where the screen disparity between the left view and the right view is zero (or near zero)—i.e., there is (ostensibly) no screen disparity.

Based on the identified feature point (including its left and right views) and the identified focus point (including its identified feature points), the depth conflict reduction system can perform act 1108 to determine the screen disparity of the identified feature point. In particular, the depth conflict reduction system can determine the screen disparity according to:

$$d_i = (p_{focus,L} - p_{focus,R}) - (p_{i,L} - p_{i,R})$$

where $p_{focus}$ is the focus point of the user or the user client device, $p_i$ is the identified feature point, L denotes a left view, and R denotes a right view.

As further shown, the depth conflict reduction system performs act 110 to determine whether there are more feature points to analyze. Indeed, the depth conflict reduction system can analyze the input video to identify a number of feature points, and the depth conflict reduction system can further determine whether the depth conflict reduction system has analyzed each feature point or if the depth conflict reduction system has already analyzed each identified feature point. In cases where the depth conflict reduction system determines that there are more feature points to analyze, the depth conflict reduction system continues to repeat acts 1102-1110 to convert an additional feature point to spherical coordinates and so on.

On the other hand, in cases where the depth conflict reduction system determines that there are no more feature points to analyze, the depth conflict reduction system continues to perform act 1112 to determine a depth of the region around the user interface by aggregating d values for nearby feature points. Indeed, as described above, the depth conflict reduction system can identify a set of feature points within a threshold angle of the user interface element and can determine an average depth for the set of feature points. By determining the average depth, the depth conflict reduction system can determine a depth of a region around the user interface element. One will appreciate that determining the depth of the region comprises determining an average disparity of feature points in the region. The disparity provides a correlation to the depth (i.e., the disparity is directly proportional to the depth). In one or more embodiments, the depth conflict reduction system determines disparities rather than actual depth values to reduce processing requirement and increase processing speed.

As also mentioned above, the depth conflict reduction system can perform a step for modifying a presentation of the input video to reduce depth conflicts between the input. Indeed, FIGS. 12 and 13 illustrate two different steps for modifying a presentation of the input video to reduce depth conflicts between the input video and user interface, which steps may be performed alternatively or additionally to each other.

Figure 12:
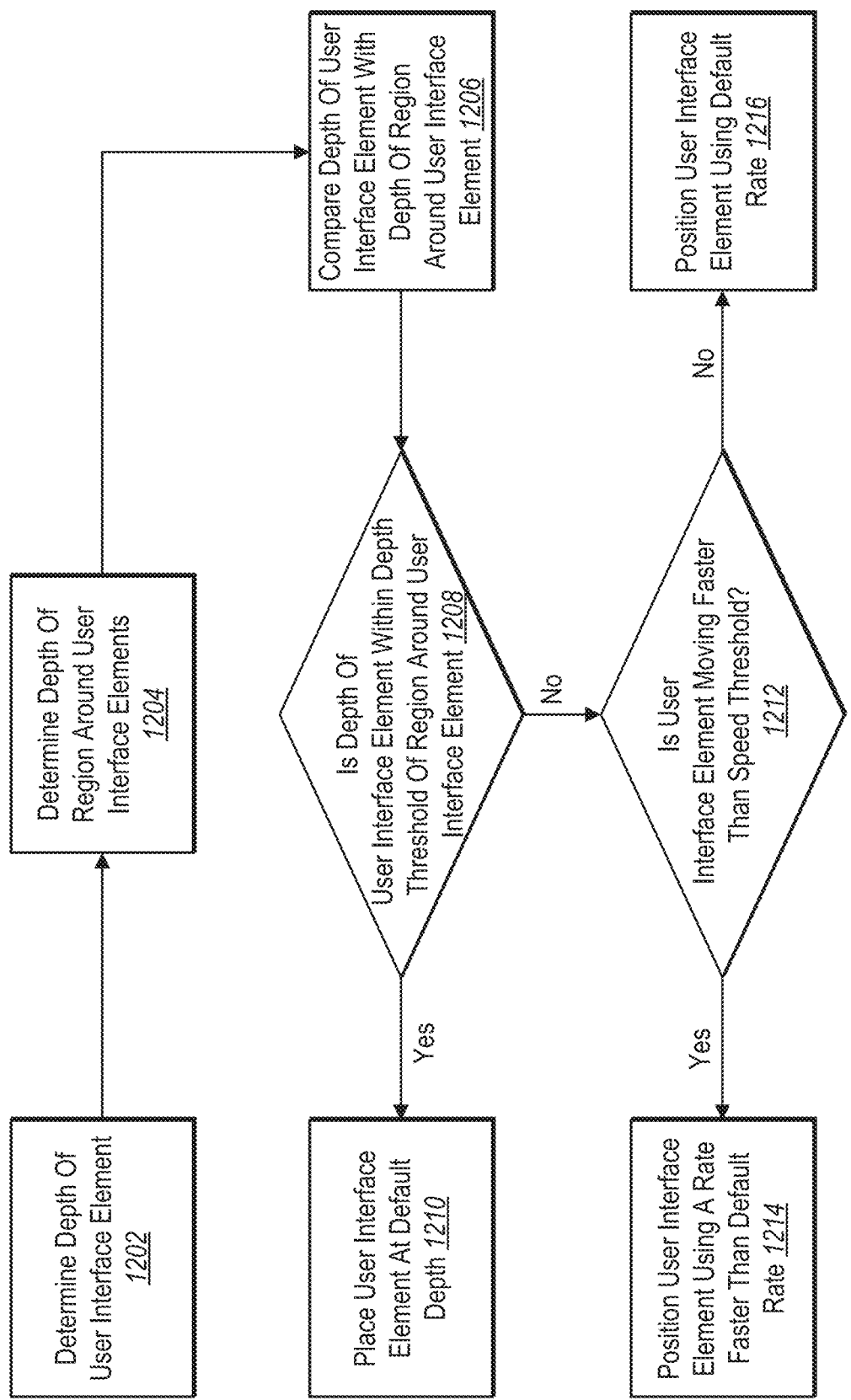
FIG. 12 illustrates a series of acts in a step for modifying a presentation of the input video and a user interface element within the input video to reduce depth conflicts between the input video and the user interface element in accordance with one or more embodiments.
Figure 13:
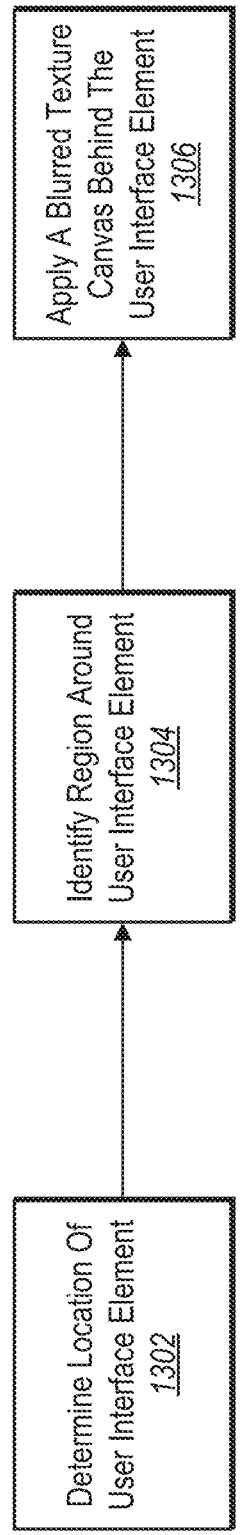
FIG. 13 illustrates a different series of acts in a step for modifying a presentation of the input video and a user interface element within the input video to reduce depth conflicts between the input video and the user interface element.

As shown in FIG. 12, the step for modifying a presentation of the input video to reduce depth conflicts between the input video and user interface elements can include acts 1202-1216. In particular, the depth conflict reduction system can perform act 1202 to determine the depth of a user interface element. Indeed, the depth conflict reduction system can determine the depth of the user interface element by determining a screen disparity between a left view of a center point of the user interface element and a right view of the center point of the user interface element.

In addition, the depth conflict reduction system can perform act 1204 to determine the depth of a region around the user interface element. As described above, the depth conflict reduction system can identify a region within a threshold angle of the user interface element and can determine the depth of the region by averaging the disparities of the feature points that are within the threshold angle of the user interface element.

The depth conflict reduction system can also perform act 1206 to compare the depth of the user interface element with the depth of the region around the user interface element. For example, the depth conflict reduction system can determine an absolute difference between the screen disparity of the center of the user interface element and the average screen disparity of the feature points that are within the region around the user interface element.

Based on the comparison, the depth conflict reduction system can perform an act 1208 to determine whether the depth of the user interface element is within a depth threshold of the region around the user interface element. If the depth conflict reduction system determines that the depth of the user interface element is within the threshold of the region around the user interface element, then the depth conflict reduction system can proceed to perform act 1210 to place the user interface element at a default depth.

On the other hand, if the depth conflict reduction system determines that the user interface element is not within the depth threshold of the region around the user interface element, then the depth conflict reduction system can determine that a depth conflict exists and can therefore continue on to perform act 1212 to further determine whether the user interface element is moving faster than a speed threshold. For example, the depth conflict reduction system can analyze the speed of movement of the user interface element in real space in relation to the video content to determine whether the user interface element is moving faster than a speed threshold of, for instance, 7 m/s.

In cases where the depth conflict reduction system determines that the user interface element is not moving faster than the speed threshold—or determines that the user interface element is moving slower than the speed threshold—the depth conflict reduction system can perform act 1216 to position the user interface element using a default rate. In particular, the depth conflict reduction system can modify the depth of the user interface element by moving the user interface element at a default rate that does not cause discomfort or distraction for a user.

Conversely, in cases where the depth conflict reduction system determines that the user interface element is moving faster than the speed threshold, the depth conflict reduction system can perform act 1214 to position the user interface element using a rate that is faster than the default rate. To illustrate, the depth conflict reduction system can modify the depth of the user interface element much more quickly when the user is moving quickly or otherwise adjusting the position of the user interface element quickly because the user is unlikely to notice such quick depth changes due to change blindness.

As illustrated in FIG. 13, the step for modifying a presentation of the input video to reduce depth conflicts between the input video and user interface elements can also or alternatively include acts 1302-1306. In particular, the depth conflict reduction system can perform act 1302 to determine a location of a user interface element. Indeed, the depth conflict reduction system can identify a center point of a user interface element and can further identify the dimensions of the user interface element. Thus, the depth conflict reduction system can determine a location of the user interface element based on its center point and dimensions.

Based on the location of the user interface element, the depth conflict reduction system can perform act 1304 to identify a region around a user interface element. In particular, the depth conflict reduction system can identify an area around or behind the user interface element that has dimensions larger than the user interface element. Indeed, in some embodiments, the region around the user interface element may be 20%, 30%, 50%, or some other percentage larger than the area of the user interface element within the user's view.

As illustrated in FIG. 13, the depth conflict reduction system can perform act 1306 to apply a blurred texture canvas behind the user interface element. In particular, the depth conflict reduction system can apply a blurring effect to the region around the user interface element by creating a blurred texture canvas having the dimensions of the region around/behind the user interface element and placing the blurred texture canvas behind the user interface element. As described above, the depth conflict reduction system can apply a blurred texture canvas where, for each pixel of the canvas, the depth conflict reduction system applies a fragment shader to determine pixel values of the input video behind the canvas to then apply a Gaussian blur kernel to each pixel. In addition, the depth conflict reduction system can vary the strength of the blurring effect so that it is strongest in the center of the canvas and gradually diminishes outward.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
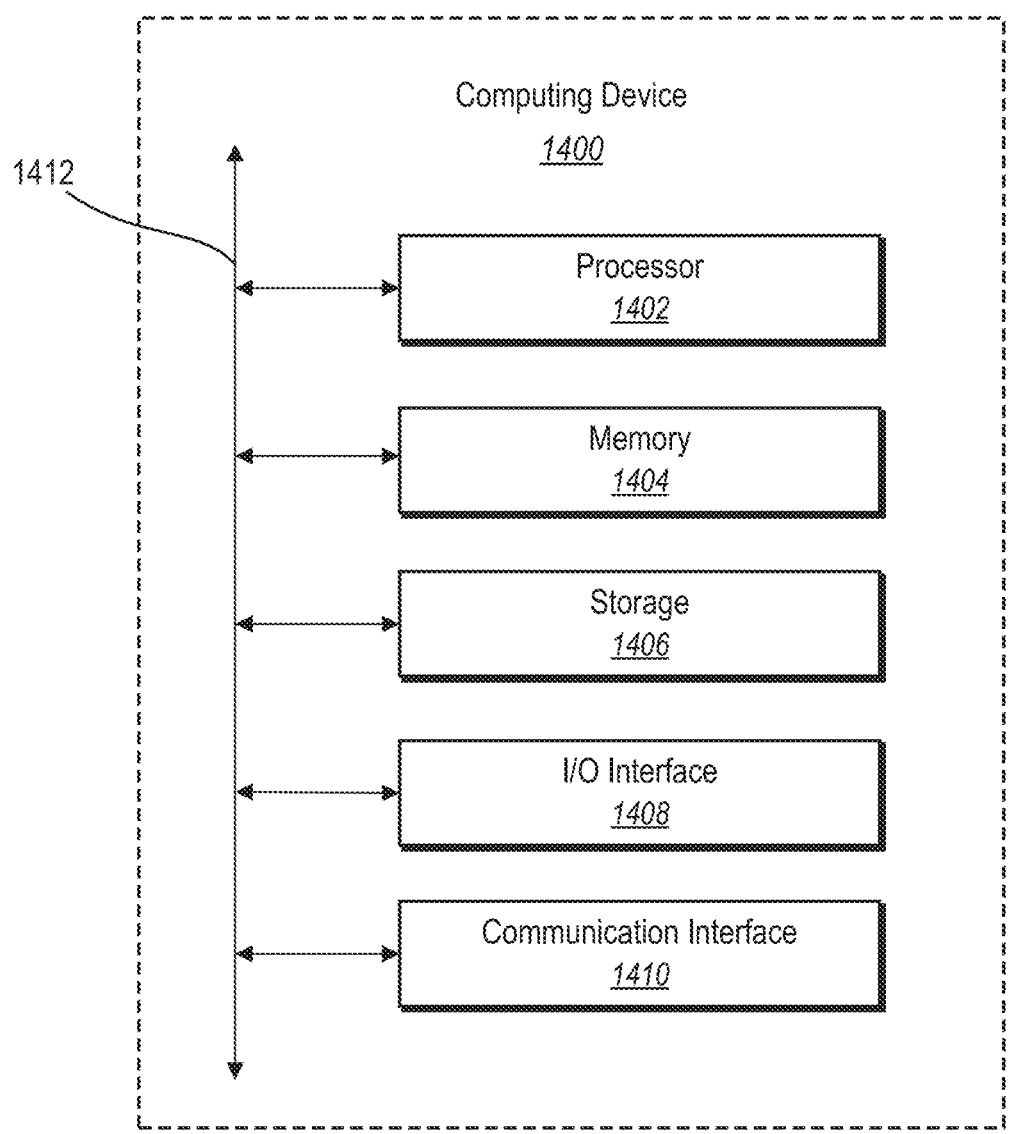
FIG. 14 illustrates a block diagram of an example computing device in accordance with one or more embodiments.

FIG. 14 illustrates, in block diagram form, an example computing device 1400 (e.g., computing device 800, client device 908, and/or server(s) 904) that may be configured to perform one or more of the processes described above. One will appreciate that the depth conflict reduction system 802 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 800 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for rendering virtual reality content, a non-transitory computer readable medium for reducing depth conflicts while providing user interface elements within video content comprising instructions that, when executed by a processor, cause a computer device to:
    analyze an input video to identify feature points within a region of the input video that is less than a viewable area of the input video, the region defined as an area within a threshold angle between a vector that originates at a user position and intersects a user interface element and another vector that originates at the user position and that, when rotated, intersects points outlining the region of the input video around the user interface element;
    determine, based on analyzing the input video, depths of the feature points within the region of the input video;
    compare the depths of the feature points with a depth of the user interface element within the input video; and
    dynamically modify, based on the comparison of the depths of the feature points with the depth of the user interface element, the depth of the user interface element to avoid depth conflicts with the feature points.

2. The non-transitory computer readable medium of claim 1, wherein the instructions cause the computer device to determine the depths of the feature points by determining, for each feature point, a screen disparity between a left view of the feature point within the input video and a right view of the feature point within the input video.

3. The non-transitory computer readable medium of claim 1, wherein the instructions further cause the computer device to determine the depth of the user interface element by determining a screen disparity between a left view of a center point of the user interface element and a right view of the center point of the user interface element.

4. The non-transitory computer readable medium of claim 1, further comprising instructions that, when executed by the processor, cause the computer device to:
    determine a depth of the region of the input video defined as the area within the threshold angle averaging the depths of the feature points within the region; and
    wherein the instructions cause the computer device to compare the depths of the feature points with the depth of the user interface element by determining a difference between the depth of the region and the depth of the user interface element.

5. The non-transitory computer readable medium of claim 4, wherein the instructions cause the computer device to modify the depth of the user interface element within the input video by minimizing a disparity between the depth of the user interface element and the depth of the region of the input video.

6. The non-transitory computer readable medium of claim 4, wherein the instructions cause the computer device to modify the depth of the user interface element by adjusting a frustum associated with a left view of the user interface element within the input video and a frustum associated with a right view of the user interface element within the input video.

7. The non-transitory computer readable medium of claim 6, further comprising instructions that, when executed by the processor, cause the computer device to detect that the user interface element is moving slower than a movement threshold; and
    wherein the instructions cause the computer device to, in response to detecting that the user interface element is moving slower than the movement threshold, adjust the frustum associated with the left view and the frustum associated with the right view at a default rate.

8. The non-transitory computer readable medium of claim 6, further comprising instructions that, when executed by the processor, cause the computer device to detect that the user interface element is moving faster than a movement threshold; and
    wherein the instructions cause the computer device to, in response to detecting that the user interface element is moving faster than the movement threshold, adjust the frustum associated with the left view and the frustum associated with the right view at a rate faster than a default rate.

9. In a digital medium environment for rendering virtual reality content, a system for reducing depth conflicts while providing user interface elements within video content comprising:
    a processor; and
    a non-transitory computer readable medium comprising instructions that, when executed by the processor, cause the system to:
        analyze an input video to identify feature points within a region of the input video that is less than a viewable area of the input video, the region defined as an area within a threshold angle between a vector that originates at a user position and intersects a user interface element and another vector that originates at the user position and that, when rotated, intersects points outlining the region of the input video around the user interface element;
        determine, based on analyzing the input video, depths of the feature points within the region of the input video by calculating screen disparities between a left view of the feature points and a right view of the feature points;

compare the depths of the feature points with a depth of the user interface element within the input video by determining a difference between the depths of the feature points and the depth of the user interface element; and dynamically modify, based on the comparison of the depths of the feature points with the depth of the user interface element, the depth of the user interface element to avoid depth conflicts with the feature points.

10. The system of claim 9, wherein the instructions further cause the system to determine the depth of the user interface element by determining a screen disparity between a left view of a center point of the user interface element and a right view of the center point of the user interface element.

11. The system of claim 9, further comprising instructions that, when executed by the processor, cause the system to:
determine a depth of the region of the input video defined as the area within the threshold angle based on the depths of the feature points within the region.

12. The system of claim 11, wherein the instructions cause the system to compare the depths of the feature points with the depth of the user interface element by determining a difference between the depth of the region of the input video and the depth of the user interface element.

13. The system of claim 9, further comprising instructions that, when executed by the processor, cause the system to detect that there is a depth conflict between the user interface element and the region of the input video within the threshold angle; and
wherein the instructions cause the system to modify, based on detecting the depth conflict, the depth of the user interface element within the input video by decreasing the depth of the user interface element.

14. The system of claim 9, further comprising instructions that, when executed by the processor, cause the system to determine that there is no depth conflict between the user interface element and the region of the input video within the threshold angle; and
wherein the instructions cause the system to modify, based on determining that there is no depth conflict, the depth of the user interface element within the input video by increasing the depth of the user interface element.

15. The system of claim 14, further comprising instructions that, when executed by the processor, cause the system to detect that the user interface element is moving slower than a movement threshold; and wherein the instructions cause the system to, in response to detecting that the user interface element is moving slower than the movement threshold, adjust a frustum associated with the left view and a frustum associated with the right view at a default rate.

16. The system of claim 14, further comprising instructions that, when executed by the processor, cause the system to detect that the user interface element is moving faster than a movement threshold; and
wherein the instructions cause the system to, in response to detecting that the user interface element is moving faster than the movement threshold, adjust a frustum associated with the left view and a frustum associated with the right view at a rate faster than a default rate.

17. In a digital medium environment for rendering virtual reality content, a computer-implemented method for reducing depth conflicts while providing user interface elements within video content for display by way of a virtual reality device, comprising:
analyzing an input video to identify feature points within a threshold angle between a vector that originates at a user position and intersects a user interface element and another vector that originates at the user position and that, when rotated, intersects points outlining a region of the input video around the user interface element;
a step for determining depths of the feature points within the input video;
a step for modifying a presentation of the input video and the user interface element within the input video to reduce depth conflicts between the input video and the user interface element; and
generating an output video that includes the modified user interface element.

18. The computer-implemented method of claim 17, wherein the step for modifying the presentation of the input video and the user interface element comprises dynamically adjusting a frustum associated with a left view of the input video and a frustum associated with a right view of the input video.

19. The computer-implemented method of claim 17, wherein the step for modifying the presentation of the input video and the user interface element comprises applying a blurring effect to a region around the user interface element within the input video.

20. The computer-implemented method of claim 19, wherein the blurring effect comprises a blur gradient.

\* \* \* \* \*